United States Patent
Cauduro Dias de Paiva et al.

(10) Patent No.: US 12,490,124 B2
(45) Date of Patent: Dec. 2, 2025

(54) TESTING METHODS AND PROCEDURES FOR SDT TECHNICAL FIELD

(71) Applicant: Nokia Technologies Oy, Espoo (FI)

(72) Inventors: Rafael Cauduro Dias de Paiva, Aalborg (DK); Lars Holst Christensen, Aalborg (DK); Bent Henneberg Rysgaard, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 560 days.

(21) Appl. No.: 17/738,335

(22) Filed: May 6, 2022

(65) Prior Publication Data

US 2023/0362689 A1     Nov. 9, 2023

(51) Int. Cl.
*H04W 24/06*     (2009.01)
*H04W 24/10*     (2009.01)
*H04W 52/24*     (2009.01)

(52) U.S. Cl.
CPC .......... *H04W 24/06* (2013.01); *H04W 24/10* (2013.01); *H04W 52/24* (2013.01)

(58) Field of Classification Search
CPC ...... H04W 24/06; H04W 24/10; H04W 52/24
See application file for complete search history.

(56) References Cited

U.S. PATENT DOCUMENTS

2022/0225280 A1*  7/2022  Yang ............... H04W 52/0241
2024/0276275 A1*  8/2024  Kumar ............. H04W 74/0833

FOREIGN PATENT DOCUMENTS

CN    116530134 A  *  8/2023  ............ H04W 24/02
TW    201215000 A  *  4/2012  ............ H04L 41/00

OTHER PUBLICATIONS

3GPP TS27.007, V17.5.0, "3rd Generation Partnership Project; Technical Specification Group Core Network and Terminals; AT command set for User Equipment (UE) (Rlease 17)", Mar. 2022, 435 pages.
3GPP TS 36.509, V17.0.0, "3rd Generation Partnership Project; Technical Specification Group Radio Access network; Evolved Universal Terrestrial Radio Access (E-UTRA) and Evolved Packet Core (EPC); Special conformance testing functions for User Equipment (UE) (Release 17)", Mar. 2022, 98 pages.

(Continued)

*Primary Examiner* — Samina F Choudhry
(74) *Attorney, Agent, or Firm* — McCarter & English, LLP; Robert J. Maura

(57) ABSTRACT

Multiple techniques for testing a UE by a Test Equipment (TE) are disclosed. A TE configures with a procedure of performance testing of data transmission to be performed while the UE is in an inactive state. The TE performs the performance testing, wherein the procedure includes at least one of: triggering the data transmission while the UE is in the inactive state; transmitting one or more test data packages; controlling time that the UE starts to transmit, while in the inactive state, payload corresponding to the test data package(s); verifying whether or not conditions for the data transmission are met; or determining whether or not the UE passed the performance testing, based on a result of the verification of whether or not conditions for the data transmission are met. The UE performs the data transmission and can send measurement results. There are multiple conditions that can be tested.

20 Claims, 11 Drawing Sheets

(56) References Cited

OTHER PUBLICATIONS

3GPP TS 38.133, V 17.5.0, "3rd Generation Partnership Project; Technical Specification Group Radio Access Network; NR; Requirements for support of radio resource management (Release 17", Mar. 2022, 71 pages.

3GPP TS 38.509, V17.0.0, "3rd Generation Partnership Project; Technical Specification Group Radio Access Network; 5GS; Special conformance testing functions for User Equipment (UE) (Release 17)", Mar. 2022, 61 pages.

3GPP TS 38.533, V17.2.0, "3rd Generation Partnership Project; Technical Specification Group Radio Access Network; NR; User Equipment (UE) conformance specification; Radio Resource Management (RRM) (Release 17)", Mar. 2022, 22 pages.

3GPP TSG-RAN2 Meeting #117-e, R2-2204217, "Summary of [AT117-e][511][Sdata] CR 38.321 (Huawei) MAC running CR review issue list", Email discussion Rapporteur (Huawei, HiSilicon), Mar. 2022, 107 pages.

* cited by examiner

TESTING METHODS AND PROCEDURES FOR SDT TECHNICAL FIELD

Exemplary embodiments herein relate generally to testing devices for wireless communications and using SDT. The methods presented can, for example, be used for verification of timing advance (TA) validation between user equipment (UEs) and system simulators.

BACKGROUND

Small Data Transmission (SDT) is a feature introduced in 3GPP Rel. 17 (third generation partnership project, release 17) for 5G (fifth generation, also referred to as new radio, NR), where small packets of data can be transmitted while the UE (user equipment, a wireless device) is in RRC (Radio Resource Control) inactive mode. This feature in intended as an energy-saving feature, since the UE can stay longer periods of time in the RRC inactive mode, which uses less power than when the UE is in an RRC connected mode.

There are two main different implementations of SDT. In one implementation, the UE transmits small transport blocks as part of the random-access procedure while in RRC inactive mode. This type of SDT transmission is referred to herein as RA-SDT (Random Access-SDT). In the other implementation, a configured grant resource is allocated for the UE to transmit while in the RRC inactive mode. The last type of SDT transmission is referred to herein as CG-SDT (configured grant-SDT).

In order for the CG-SDT to function properly, there is a mechanism for the UE to keep synchronicity in UL (uplink, from the UE to the network). Such a mechanism can be used during testing, when the timing advance (TA) used by the UE is being validated by the UE.

Furthermore, for TA validation, the UE should be tested to ensure it meets multiple criteria.

BRIEF SUMMARY

This section is intended to include examples and is not intended to be limiting.

In an exemplary embodiment, a method is disclosed that includes configuring a user equipment, by transmission from a testing equipment, at least part of a procedure of performance testing of data transmission to be performed while the user equipment is in a radio resource control inactive state. The method includes performing, by the testing equipment, the at least part of the procedure of performance testing of data transmission while the user equipment is in the radio resource control inactive state; wherein the at least part of the procedure includes at least one of: triggering the data transmission while the user equipment is in the radio resource control inactive state; transmitting one or more test data packages; controlling time that the user equipment starts to transmit, while in the radio resource control inactive state, payload corresponding to at least one of the one or more test data packages; verifying whether or not conditions for the data transmission are met; or determining whether or not the user equipment passed the performance testing, based on a result of the verification of whether or not conditions for the data transmission are met.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: configure a user equipment, by transmission from a testing equipment, at least part of a procedure of performance testing of data transmission to be performed while the user equipment is in a radio resource control inactive state; and perform, by the testing equipment, the at least part of the procedure of performance testing of data transmission while the user equipment is in the radio resource control inactive state; wherein the at least part of the procedure includes at least one of: triggering the data transmission while the user equipment is in the radio resource control inactive state; transmitting one or more test data packages; controlling time that the user equipment starts to transmit, while in the radio resource control inactive state, payload corresponding to at least one of the one or more test data packages; verifying whether or not conditions for the data transmission are met; or determining whether or not the user equipment passed the performance testing, based on a result of the verification of whether or not conditions for the data transmission are met.

An exemplary computer program product includes a computer-readable storage medium bearing computer program code embodied therein for use with a computer. The computer program code includes: code for configuring a user equipment, by transmission from a testing equipment, at least part of a procedure of performance testing of data transmission to be performed while the user equipment is in a radio resource control inactive state; and code for performing, by the testing equipment, the at least part of the procedure of performance testing of data transmission while the user equipment is in the radio resource control inactive state; wherein the at least part of the procedure includes at least one of: triggering the data transmission while the user equipment is in the radio resource control inactive state; transmitting one or more test data packages; controlling time that the user equipment starts to transmit, while in the radio resource control inactive state, payload corresponding to at least one of the one or more test data packages; verifying whether or not conditions for the data transmission are met; or determining whether or not the user equipment passed the performance testing, based on a result of the verification of whether or not conditions for the data transmission are met.

In another exemplary embodiment, an apparatus comprises means for performing: configuring a user equipment, by transmission from a testing equipment, at least part of a procedure of performance testing of data transmission to be performed while the user equipment is in a radio resource control inactive state; and performing, by the testing equipment, the at least part of the procedure of performance testing of data transmission while the user equipment is in the radio resource control inactive state; wherein the at least part of the procedure includes at least one of: triggering the data transmission while the user equipment is in the radio resource control inactive state; transmitting one or more test data packages; controlling time that the user equipment starts to transmit, while in the radio resource control inactive state, payload corresponding to at least one of the one or more test data packages; verifying whether or not conditions for the data transmission are met; or determining whether or not the user equipment passed the performance testing, based on a result of the verification of whether or not conditions for the data transmission are met.

In an exemplary embodiment, a method is disclosed that includes receiving, at a user equipment, a configuration of at least part of a procedure of performance testing of data transmission, the procedure to be performed while the user equipment is in a radio resource control inactive state. The method also includes performing, at the user equipment, based on the configuration, the at least part of a procedure of performance testing of data transmission while the user equipment is in the radio resource control inactive state, wherein the at least part of the procedure includes at least one of: receiving signaling of triggering the data transmission; receiving one or more test data packages; starting to transmit payload corresponding to at least one of the received one or more test data packages in radio resource control inactive state, based on the configuration; or transmitting one or more measurement results based on one or more corresponding measurements made at the user equipment.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: receiving, at a user equipment, a configuration of at least part of a procedure of performance testing of data transmission, the procedure to be performed while the user equipment is in a radio resource control inactive state; and performing, at the user equipment, based on the configuration, the at least part of a procedure of performance testing of data transmission while the user equipment is in the radio resource control inactive state, wherein the at least part of the procedure includes at least one of: receiving signaling of triggering the data transmission; receiving one or more test data packages; starting to transmit payload corresponding to at least one of the received one or more test data packages in radio resource control inactive state, based on the configuration; or transmitting one or more measurement results based on one or more corresponding measurements made at the user equipment.

An exemplary computer program product includes a computer-readable storage medium bearing computer program code embodied therein for use with a computer. The computer program code includes: code for receiving, at a user equipment, a configuration of at least part of a procedure of performance testing of data transmission, the procedure to be performed while the user equipment is in a radio resource control inactive state; and code for performing, at the user equipment, based on the configuration, the at least part of a procedure of performance testing of data transmission while the user equipment is in the radio resource control inactive state, wherein the at least part of the procedure includes at least one of: receiving signaling of triggering the data transmission; receiving one or more test data packages; starting to transmit payload corresponding to at least one of the received one or more test data packages in radio resource control inactive state, based on the configuration; or transmitting one or more measurement results based on one or more corresponding measurements made at the user equipment.

In another exemplary embodiment, an apparatus comprises means for performing: receiving, at a user equipment, a configuration of at least part of a procedure of performance testing of data transmission, the procedure to be performed while the user equipment is in a radio resource control inactive state; and performing, at the user equipment, based on the configuration, the at least part of a procedure of performance testing of data transmission while the user equipment is in the radio resource control inactive state, wherein the at least part of the procedure includes at least one of: receiving signaling of triggering the data transmission; receiving one or more test data packages; starting to transmit payload corresponding to at least one of the received one or more test data packages in radio resource control inactive state, based on the configuration; or transmitting one or more measurement results based on one or more corresponding measurements made at the user equipment.

In an exemplary embodiment, a method is disclosed that includes configuring a user equipment, by transmission from a testing equipment, at least part of a procedure to be performed while the user equipment is in a radio resource control inactive state. The method includes performing, by the testing equipment, the at least part of the procedure of performance testing of data transmission while the user equipment is in the radio resource control inactive state, wherein the at least part of the procedure is configured to start with a first transmit power level, which is changed to a second transmit power level during a measurement window to be used at the user equipment for measuring one or more reference signals, and the at least part of the procedure is configured to change transmission power back to the first power level when the user equipment is expected to perform measurement in the measurement window. The method also includes verifying whether or not one or more conditions for the data transmission are met.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: configuring a user equipment, by transmission from a testing equipment, at least part of a procedure to be performed while the user equipment is in a radio resource control inactive state; performing, by the testing equipment, the at least part of the procedure of performance testing of data transmission while the user equipment is in the radio resource control inactive state, wherein the at least part of the procedure is configured to start with a first transmit power level, which is changed to a second transmit power level during a measurement window to be used at the user equipment for measuring one or more reference signals, and the at least part of the procedure is configured to change transmission power back to the first power level when the user equipment is expected to perform measurement in the measurement window; and verifying whether or not one or more conditions for the data transmission are met.

An exemplary computer program product includes a computer-readable storage medium bearing computer program code embodied therein for use with a computer. The computer program code includes: code for configuring a user equipment, by transmission from a testing equipment, at least part of a procedure to be performed while the user equipment is in a radio resource control inactive state; code for performing, by the testing equipment, the at least part of the procedure of performance testing of data transmission while the user equipment is in the radio resource control inactive state, wherein the at least part of the procedure is configured to start with a first transmit power level, which is changed to a second transmit power level during a measurement window to be used at the user equipment for measuring one or more reference signals, and the at least part of the procedure is configured to change transmission power back to the first power level when the user equipment is expected to perform measurement in the measurement window; and code for verifying whether or not one or more conditions for the data transmission are met.

In another exemplary embodiment, an apparatus comprises means for performing: configuring a user equipment, by transmission from a testing equipment, at least part of a procedure to be performed while the user equipment is in a radio resource control inactive state; performing, by the testing equipment, the at least part of the procedure of performance testing of data transmission while the user equipment is in the radio resource control inactive state, wherein the at least part of the procedure is configured to start with a first transmit power level, which is changed to a second transmit power level during a measurement window to be used at the user equipment for measuring one or more reference signals, and the at least part of the procedure is configured to change transmission power back to the first power level when the user equipment is expected to perform measurement in the measurement window; and verifying whether or not one or more conditions for the data transmission are met.

In an exemplary embodiment, a method is disclosed that includes configuring a user equipment, by transmission from a testing equipment, at least part of a procedure to be performed while the user equipment is in a radio resource control inactive state. The method includes performing, by the testing equipment, the at least part of the procedure of performance testing of data transmission while the user equipment is in the radio resource control inactive state, the performing comprising transmitting first and second power levels, at least the second power level transmitted during a first measurement window to be used by the user equipment for measuring one or more reference signals. The method further includes verifying whether or not conditions for the data transmission are met, wherein in response to a validation condition for a timing advance is not being satisfied. The method includes transmitting by the testing equipment a third power level before a start of a second measurement window to be used at the user equipment for measuring one or more reference signal. The method includes, in response to the second measurement window starting, transmitting by the testing equipment transmits a fourth power level; and verifying conditions for the data transmission are met for the third and fourth power levels.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: configure a user equipment, by transmission from a testing equipment, at least part of a procedure to be performed while the user equipment is in a radio resource control inactive state; perform, by the testing equipment, the at least part of the procedure of performance testing of data transmission while the user equipment is in the radio resource control inactive state, the performing comprising transmitting first and second power levels, at least the second power level transmitted during a first measurement window to be used by the user equipment for measuring one or more reference signals; verify whether or not conditions for the data transmission are met, wherein in response to a validation condition for a timing advance is not being satisfied; transmit by the testing equipment a third power level before a start of a second measurement window to be used at the user equipment for measuring one or more reference signal; in response to the second measurement window starting, transmit by the testing equipment transmits a fourth power level; and verifying conditions for the data transmission are met for the third and fourth power levels.

An exemplary computer program product includes a computer-readable storage medium bearing computer program code embodied therein for use with a computer. The computer program code includes: code for configuring a user equipment, by transmission from a testing equipment, at least part of a procedure to be performed while the user equipment is in a radio resource control inactive state; code for performing, by the testing equipment, the at least part of the procedure of performance testing of data transmission while the user equipment is in the radio resource control inactive state, the performing comprising transmitting first and second power levels, at least the second power level transmitted during a first measurement window to be used by the user equipment for measuring one or more reference signals; code for verifying whether or not conditions for the data transmission are met, wherein in response to a validation condition for a timing advance is not being satisfied; code for transmitting by the testing equipment a third power level before a start of a second measurement window to be used at the user equipment for measuring one or more reference signal; code for in response to the second measurement window starting, transmitting by the testing equipment transmits a fourth power level; and code for verifying conditions for the data transmission are met for the third and fourth power levels.

In another exemplary embodiment, an apparatus comprises means for performing: configuring a user equipment, by transmission from a testing equipment, at least part of a procedure to be performed while the user equipment is in a radio resource control inactive state; performing, by the testing equipment, the at least part of the procedure of performance testing of data transmission while the user equipment is in the radio resource control inactive state, the performing comprising transmitting first and second power levels, at least the second power level transmitted during a first measurement window to be used by the user equipment for measuring one or more reference signals; verifying whether or not conditions for the data transmission are met, wherein in response to a validation condition for a timing advance is not being satisfied; transmitting by the testing equipment a third power level before a start of a second measurement window to be used at the user equipment for measuring one or more reference signal; in response to the second measurement window starting, transmitting by the testing equipment transmits a fourth power level; and verifying conditions for the data transmission are met for the third and fourth power levels.

BRIEF DESCRIPTION OF THE DRAWINGS

In the attached Drawing Figures:

FIG. 7A illustrates a Test 1 and FIG. 7B illustrates a Test 2;

FIG. 8, spread over

DETAILED DESCRIPTION OF THE DRAWINGS

Figure 1:
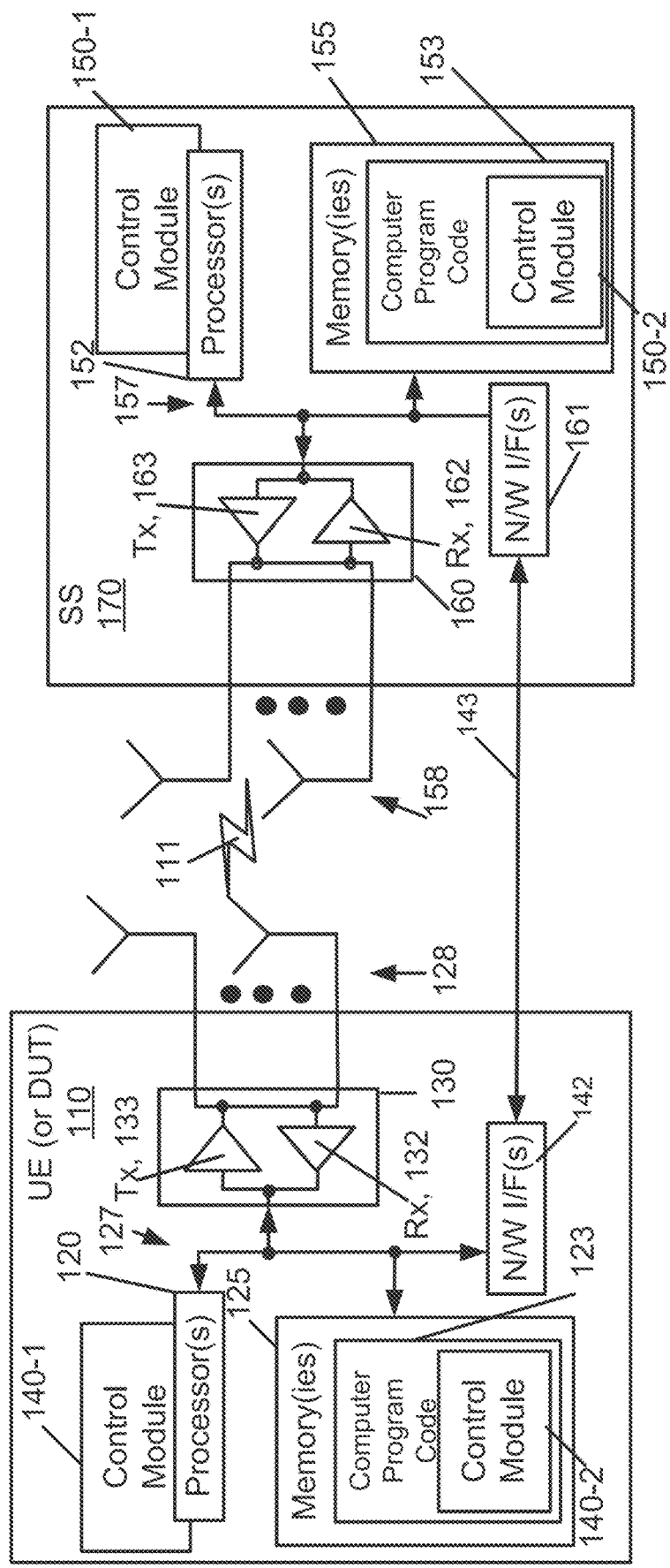
FIG. 1 is a block diagram of one possible and non-limiting exemplary system in which the exemplary embodiments may be practiced.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

When more than one drawing reference numeral, word, or acronym is used within this description with "/", and in general as used within this description, the "/" may be interpreted as "or", "and", or "both".

As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

For ease of reference, the rest of the text is divided into sections. The section headings are merely exemplary.

I. Exemplary System

The exemplary embodiments herein describe techniques for verification of the UE behavior by a system simulator in an RRC inactive state, including timing advance validation for CG-SDT transmissions, or other types of SDT transmissions, like RA-SDT. Additional description of these techniques is presented after a system into which the exemplary embodiments may be used is described.

Turning to FIG. 1, this figure shows a block diagram of one possible and non-limiting exemplary system in which the exemplary embodiments may be practiced. A user equipment (UE) 110 is in wireless communication with a system simulator (SS) 170. The UE 110 may be a device under test (DUT), and the SS 170 may be a test equipment or possibly be referred to by other names. The terms SS and test equipment are exchangeable in this document. Regardless, the SS 170 performs a limited set of functions of a base station intended for the test purpose, such as a gNB (a 5G base station) or an eNB (an LTE base station), as well as other functions that are specific to testing methods.

The UE 110 is a wireless, typically mobile device that can access a wireless network. The UE 110 includes circuitry comprising one or more processors 120, one or more memories 125, one or more network (N/W) interfaces (I/Fs) 141, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The N/W I/F(s) may be used to communicate via wired communications, such as The UE 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with SS 170 via a wireless link or via a cable between the antenna connectors 111. The test setup of FIG. 1 may also include a physical (using cables) digital interface between the DUT and the SS 170 which is used by the SS to provide test commands to the DUT, which include AT commands or other proprietary methods of control for test purposes. This is illustrated by a link 143 between the network interfaces 141 (in the UE) and 161 (in the SS 170, and described below).

The SS 170 acts like a base station, which typically provides access by wireless devices such as the UE 110 to a wireless network. Herein, the SS 170 may be assumed to act as a gNB, although other options are possible.

The SS 170 includes circuitry comprising one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The one or more network interfaces 161 may communicate using a digital link 143 for use by the SS 170 to provide test commands to the DUT, which may include AT commands.

The SS 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the SS 170 to perform one or more of the operations as described herein.

The computer readable memories 125 and 155 may be of any type suitable to the local technical environment and may be implemented using any suitable data storage technology, such as semiconductor-based memory devices, flash memory, firmware, magnetic memory devices and systems, optical memory devices and systems, fixed memory and removable memory. The computer readable memories 125 and 155 may be means for performing storage functions. The processors 120 and 152 may be of any type suitable to the local technical environment, and may include one or more of general-purpose computers, special purpose computers, microprocessors, digital signal processors (DSPs) and processors based on a multi-core processor architecture, as non-limiting examples. The processors 120, and 152 may be means for performing functions, such as controlling the UE 110, SS 170, and other functions as described herein.

In general, the various embodiments of the user equipment 110 can include, but are not limited to, cellular telephones (such as smart phones, mobile phones, cellular phones, voice over Internet Protocol (IP) (VoIP) phones, and/or wireless local loop phones), tablets, portable computers, vehicles or vehicle-mounted devices for, e.g., wireless V2X (vehicle-to-everything) communication, image capture devices such as digital cameras, gaming devices, music storage and playback appliances, Internet appliances (including Internet of Things, IoT, devices), IoT devices with sensors and/or actuators for, e.g., automation applications, as well as portable units or terminals that incorporate combinations of such functions, laptop-embedded equipment (LEE), laptop-mounted equipment (LME), Universal Serial Bus (USB) dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. That is, the UE 110 could be any end device that may be capable of wireless communication. By way of example rather than limitation, the UE may also be referred to as a communication device, terminal device (MT), a Subscriber Station, a Portable Subscriber Station, a Mobile Station (MS), or an Access Terminal.

Having thus introduced one suitable but non-limiting technical context for the practice of the exemplary embodiments, the exemplary embodiments will now be described with greater specificity.

II. Examples related to interfaces for testing of SDT transmission in the RRC inactive mode This section relates to interfaces for testing of SDT transmission in the RRC inactive mode. Much of this section may also have bearing on section III, described below.

Before proceeding with additional description, it is noted that modes of a UE, such as a connected mode or inactive mode are described herein. These modes may also be referred to as states. Further, the modes or messages may be capitalized, in all capitals, or have other minor differences in font. For example, RRC_CONNECTED, RRC_Connected, and RRC connected are all considered to be the same mode. Furthermore, the names of these modes include the RRC inactive state, RRC idle state, and the RRC connected state. It is possible these may be referred to by different names, but the idle state is a power-saving state where data is not exchanged, the connected state is a state where data transmissions occur, and the inactive state is another power-saving state, but one where the UE is able to return quickly to the connected state.

II.a. Introduction of the Technical Area

This section provides an introduction of the technical area. As previously described, in order for the CG-SDT to function properly, there is a mechanism for the UE to keep synchronicity in UL (uplink, from the UE to the network). While in RRC connected mode, the gNB (a base station providing access by the UE to the network) is able to align the UL transmissions though timing advance commands, TACs. However, when the UE is moved to the RRC inactive mode, there are no means for the gNB to keep this message exchange and keep the UL transmissions synchronous to the UL resources. Therefore, as part of the CG-SDT work, a TA validation mechanism is defined as part of RAN2 and RAN4 (see 3GPP TS 38.133 clause 5.5). This validation basically is responsible to detect if the UE has moved, since a large UE movement would imply in a different propagation delay.

The TA validation procedure for CG-SDT works as follows. Two RSRP values are collected by the UE, as follows: RSRP1 is collected next to the time when the TAC is received by the UE; and RSRP2 is collected at the moment when the TA validation is performed for transmitting in a CG-SDT occasion.

While the UE is still in the RRC connected mode, in response to the UE receiving a TAC command at time T1, the UE should make also an RSRP measurement, RSRP1 at time T1'. This measurement RSRP1 is considered valid for the purpose of CG-SDT only if $|T1-T1'|<W1$, where W1 is the window where the first RSRP value should be collected. The UE goes into the RRC inactive mode when the UE receives an RRC Release with a suspend message from the gNB, and the UE may use SDT resources if this message includes the SDT configuration. In order for the UE to transmit in a CG-SDT resource, the UE should measure RSRP2 at time T2', so that the UE can make a decision to transmit on CG-SDT at time T2, where T2−W2<T2'<T2, and W2 is the window where the RSRP2 should be measured. Additionally, there might be a limit Z on the time T3 of the transmission on the CG-SDT resource and the time T2 as T3-T2<Z. The UE may transmit on the CG-SDT occasion if the UE has valid RSRP1 and RSRP2 measurements and if |RSRP1−RSRP2|<cg-SDT-RSRP-ChangeThreshold.

Once the UE meets these requirements, the UE should be able to transmit with a small UL timing error on a CG-SDT occasion. This transmission also has requirements for the timing accuracy, as described in section 7.1.2 of 3GPP TS 38.133.

Figure 2:
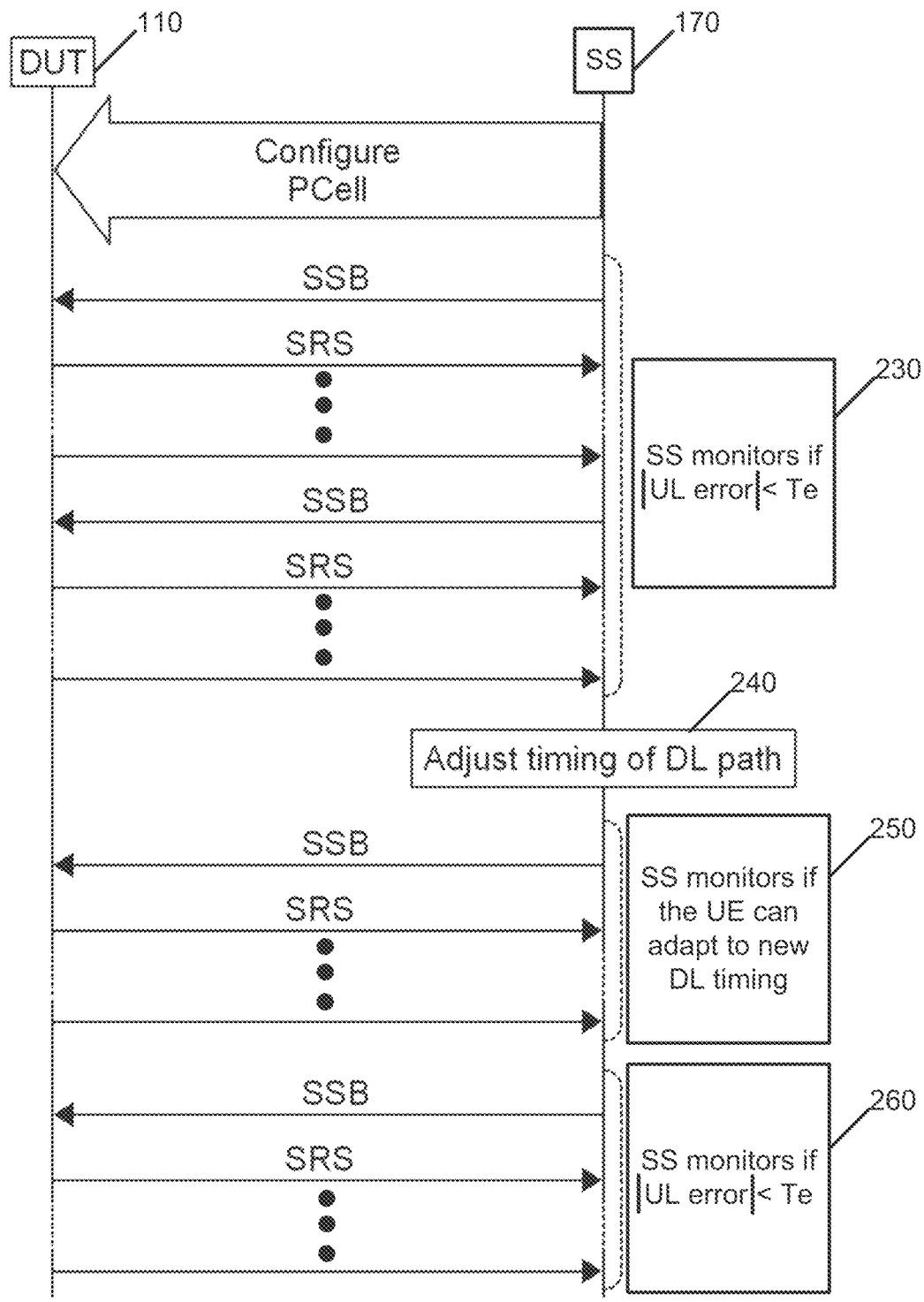
FIG. 2 is a signaling diagram illustrating a procedure for verification of the UL timing requirements of a UE.

Concerning an UL timing test case, existing UL timing accuracy (Te) requirements are tested in the appendix sections of 3GPP TS 38.133 for UEs while in RRC connected mode. One example is the test for Standalone in FR2, which is defined in clause A.7.4.1. In this clause, a system is configured with 240 kHz SSB, which has a periodicity of 20 ms, and 120 kHz SCS transmission in UL. The test is conducted in RRC_CONNECTED state. The test is composed of the following steps, as illustrated by FIG. 2, which is a signaling diagram illustrating a procedure for verification of the UL timing requirements of a UE:

1. A single NR PCell is configured by the TE (test equipment) 170 and used. In this example, a UE is illustrated by the DUT, device under test, 110.

2. After connection setup, the test equipment verifies whether the initial transmission timing error is within ±Te based on the SRS signal transmitted from the UE under test (and the corresponding SSB transmitted by the SS 170). See block 230, where |UL error|<$T_e$.

3. The system simulator adjusts the timing of the DL path by a constant shift. See block 240.

4. The test equipment verifies again that the UE is able to adjust its transmit timing so that the transmit timing error is within ±Te while following the adjustment step size and the adjustment rate requirements of clause 7.1.2.1 of 3GPP TS 38.133. See block 250, where the SS 170 monitors if the UE can adapt to the new DL timing and also block 260, where the SS monitors if the transmit timing error is within ±Te. This is illustrated by |UL error|<$T_e$.

Example test methodology is now described. While testing devices, the best technique is to test the device as a black box, and the most common use case is having the device connected to a network simulator (SS 170) via the air interface only. However, this is not possible in all use cases. For example, when testing data transfer, it is important for the network simulator to be able to trigger transmissions and to have control of what the device is sending. In the example above, the SS does not have to trigger data transmissions from the UE, since the SS configures SRS and is able to perform the test based on reference signals such as SRS. The same is not possible for SDT tests, since the SDT messages should contain data to be sent while in RRC inactive mode, and not pure reference signals as in the UL timing test case.

For such a case, specific Over The Air Test commands, OTA TST commands, are used. The test commands have their own protocol discriminator/protocol end point, a protocol running in parallel to other protocols at layer 3 level, like RRC, MM, and the like. The test commands are specified in 3GPP TS 38.509 for NR, and in 3GPP TS 36.509 for LTE.

Figure 3:
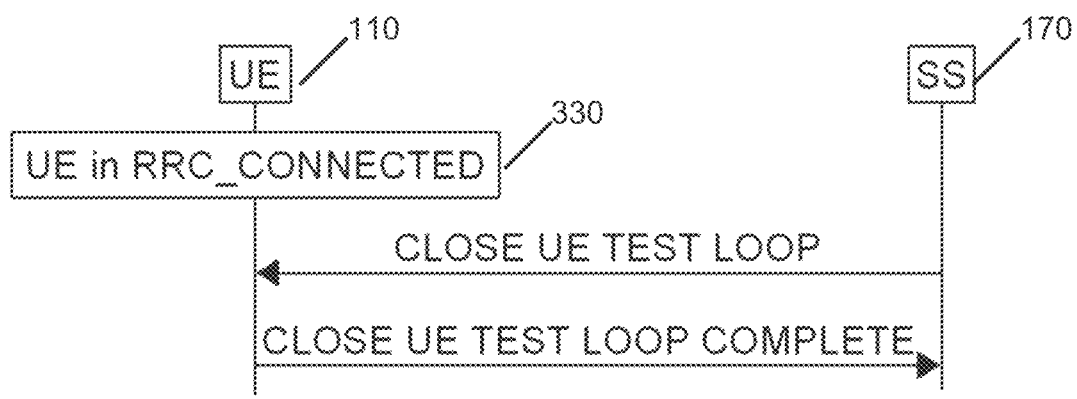
FIG. 3 is a signaling diagram illustrating OTA TST command for test loops.

One set of commands is for loop back of data, meaning the network simulator sends data towards the device and the device is configured to send the same frames back in the uplink. The mapping between downlink and uplink and at which protocol layer loopback is performed, can be configured. The general principle is shown in FIG. 3, which is a signaling diagram illustrating OTA TST command for test loops. The UE is in the RRC_Connected state in block 330, and the SS (system simulator) 170 signals the UE 110 to close the UE test loop. The UE 110 then indicates back to the SS 170 that the close UE test loop is complete via signaling.

Another way to control the device is via MT/Terminal Equipment communication as suggested in 3GPP TS 27.007. This requires a physical interface separate to the 3GPP air interface which allows the exchange of AT (ATtention) commands. In this way, it is possible to command and control test procedures in the device. An example is for V2X testing, which is given in section 15 of 3GPP TS 27.007.

Various test modes and test commands are defined in 3GPP TS 36.509 and 3GPP TS 38.509. Test loops generally require that the PDUs to loopback are transmitted by the system tester in the downlink. One of the defined test loop modes is called "UE test loop mode B" and allows setting a timer (e.g., using an integer number of seconds) so that the UE loops back the data in the UL after the timer has expired. This allows delay in the loopback function, which could be useful for basic SDT testing. However, this mode is very limited in timer granularity, and there is no control of when and how much of the buffered data are scheduled for loopback. It is a "one-shot" solution, where the only possible method is to loopback all the buffered data, and further uplink can only be scheduled upon reception of new downlink data by the UE.

AT commands are also used to control UE behavior during testing. Standardized AT commands are defined in 3GPP TS 27.007, but devices typically also support proprietary commands or extensions. The AT command +CCUTLE is currently defined in 3GPP TS 38.509, clause 5.3.2.2, and this is pending to be added to 3GPP TS 27.007. This command can be used for NR Sidelink to (among other things) trigger transmission by the UE being tested, after the test loop has previously been closed. However, no specific timing on when the transmission takes place can be indicated.

II.b. Exemplary Embodiments for Testing of SDT Transmission in the RRC Inactive Mode These and other issues may be addressed by the exemplary embodiments herein. Examples here enable methods to force the use of SDT for testing, with options to repeat as many times as needed to verify the device without excessive signaling. This will provide the ability to test one or more of the following:

1) Any part of the SDT features, protocols, the SDT decision tree, i.e., verify which SDT procedure that is used, and the like;
2) The TA validation procedure; and/or
3) The timing of uplink transmissions.

Three exemplary methods are suggested, as follows.

1. Method 1: A pure loopback mode, where the TST CMD configures everything in relation to what to send and when, see FIG. 4.
2. Method 2: A combination of TST CMD configuration and AT commands to configure and trigger an SDT procedure, see FIG. 5.

3. Method 3: A pure AT command-based procedure, where the AT command provides the data frames to send as well as timing of the SDT procedure, see FIG. 6.

With these methods, test data package(s) may be communicated from the SS 170 to the UE 110, and the test data package(s) are transmitted by the UE according to the configured test method that defines the communication sequence to be performed. The UE performs communication as indicated by the SS in order to perform the test(s), and the SS monitors the UE behavior and reports the results. In further detail, the test data packages define (e.g., potentially include) the data that the UE should transmit, and the sequence to be performed to transmit the data is configured with, e.g., a test loop mode command or AT command.

These exemplary methods are now described.

Figure 4:
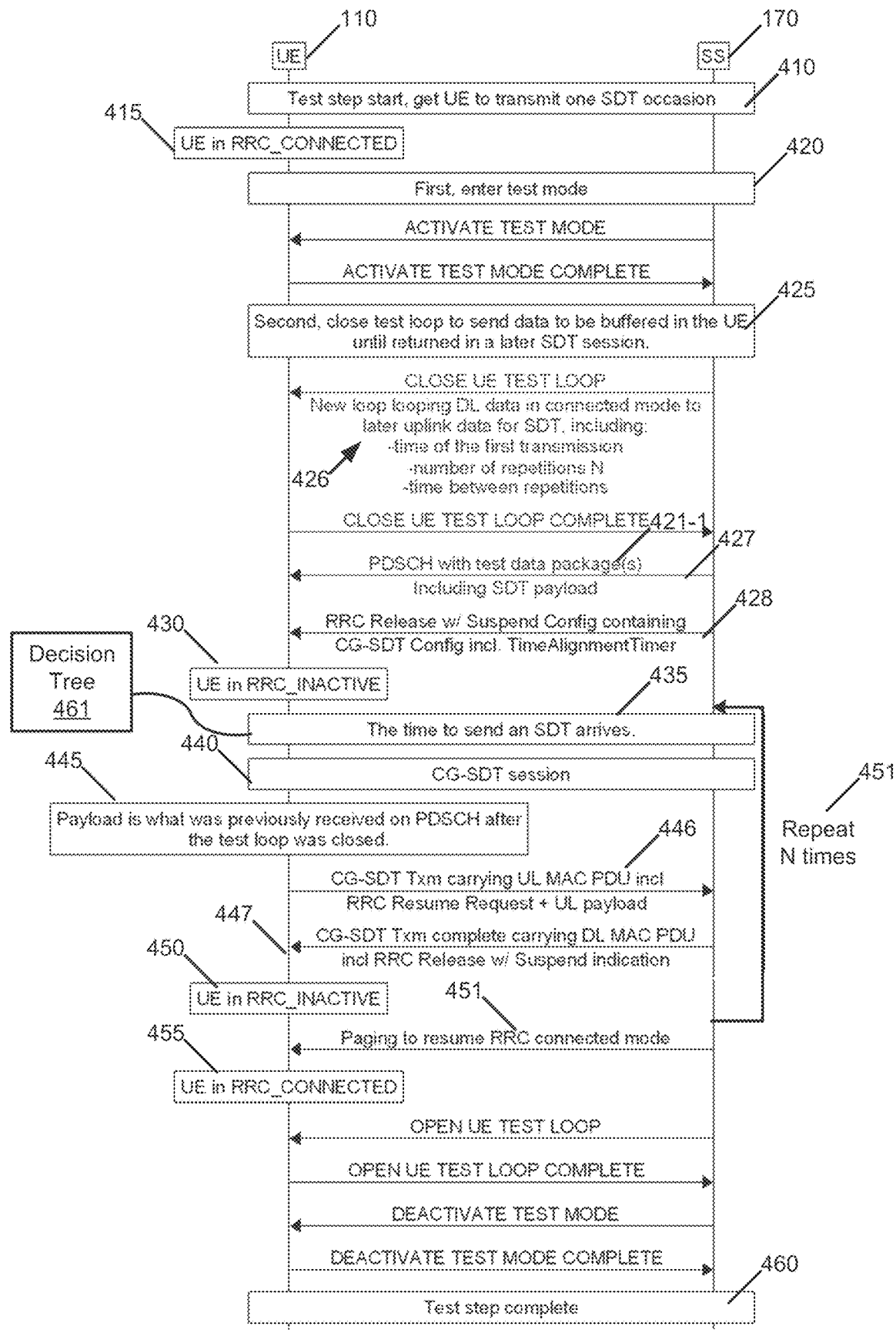
FIG. 4 illustrates a signaling and time diagram for a first exemplary method (Method 1) using a test loop for testing SDT sessions using a pure loopback mode, in accordance with an exemplary embodiment.

In the example Method 1 shown in FIG. 4, a loopback implementation is proposed. As part of this implementation, the SS indicates that the UE should send SDT messages at a given time configured by the SS. Block 410 indicates that the test step starts, by getting the UE 110 to transmit one SDT session. The main steps that are involved in the loopback communication can be described as follows.

Step 1. First, activate test mode. See block 420.
 1.a. The SS 170 has to send an ACTIVATE TEST MODE message indicating this activation. This message is sent over the air while the UE is RRC connected mode (see block 415).
 1.b. This step enables the DUT (UE 110) to start to receive test commands, and the UE responds with an ACTIVATE TEST MODE COMPLETE message. In these examples, the UE 110 is considered to be the DUT.

Step 2. Close UE test loop, as indicated by block 425.
 2.a. In this step (close UE test loop), the SS 170 indicates to the DUT 170 the test mode that is used for sending SDT in UL while the UE is in RRC inactive mode.
 2.b. As part of the message sent to the DUT, the message may include (see reference 426):
  2.b.i. Indication of the test mode using small data transmission (SDT);
  2.b.ii. Indication of the time when SDT messages (e.g., a first transmission of these) should be sent in UL.
  2.b.iii. Indication on the number (N) of repetitions that the SDT package should be transmitted. One value can be used to indicate the UE that the repetitions should take place as long as the UE is RRC inactive, or that the UE TEST LOOP is still activated.
  2.b.iv. Indication on the time period between the repetitions.
 2.c. The UE responds with a "close UE test loop complete" message.

Step 3. PDSCH data transmission.
 3.a. In this step, the SS sends a PDSCH with test data package(s) 421-1 that include the payload that should be used by the UE (see signaling 427).

Step 4. Move the UE to the RRC inactive state (see block 430).
 4.a. This step is accomplished by the SS by sending a RRC release with suspend to the UE. See signaling 428, including RRC release w/ suspend configuration containing CG-SDT and RA-SDT configuration (config.) including (incl.) TimeAlignmentTimer).
 4.b. With this message, the UE transitions to the RRC inactive state (see block 430), and receives the configuration for SDT.

Step 5. At the time configured in the "Close UE test loop" step, the following occurs. The time is indicated by block 435.
 5.a. The UE is expected to initiate a SDT transmission.
 5.b. If the transmit power used by the SS allows for CG-SDT transmission, i.e., the measured RSRP value by the UE meets the TA validation criteria, the UE will transmit the payload, received in PDSCH during step 3 and defined by the test data package(s) 421-1, using CG-SDT (as per block 435), otherwise the UE will use RA-SDT. This is indicated by block 445, the signaling 446 ("CG-SDT Txm (transmission) carrying UL MAC PDU incl RRC Resume Request+ UL payload"), and signaling 447 (the "CG-SDT Txm complete carrying DL MAC PDU incl RRC Release w/ Suspend indication"). After this, the UE moves into the RRC_Inactive mode (see block 450). Note that there is a decision tree 461 that may be used to determine what type of SDT to perform based on different parameters. It is not a given that RA-SDT is allowed. This is explained below in reference to FIG. 4A.
 5.c. This step is repeated N times (see block 451) with the periodicity configured in step 2.

Step 6. The SS 170 pages the UE 110. See signaling 451 ("Paging to resume RRC connected mode").
 6.a. This step is used for the UE to come back into RRC connected state (see block 455), and enable further loopback commands.

Step 7. Conclusion of the testing mode.
 7.a. The UE is in the RRC_Connected mode 455 after the paging, and the SS 170 sends an OPEN UE TEST LOOP message, which deactivates the test loop. The UE responds with an OPEN UE TEST LOOP COMPLETE message.
 7.b. The SS sends a DEACTIVATE TEST MODE message, after which the UE deactivates the test mode and returns to normal operation. The UE responds with a DEACTIVATE TEST MODE COMPLETE message.

The test step is now complete. See block 460.

Figure 4A:
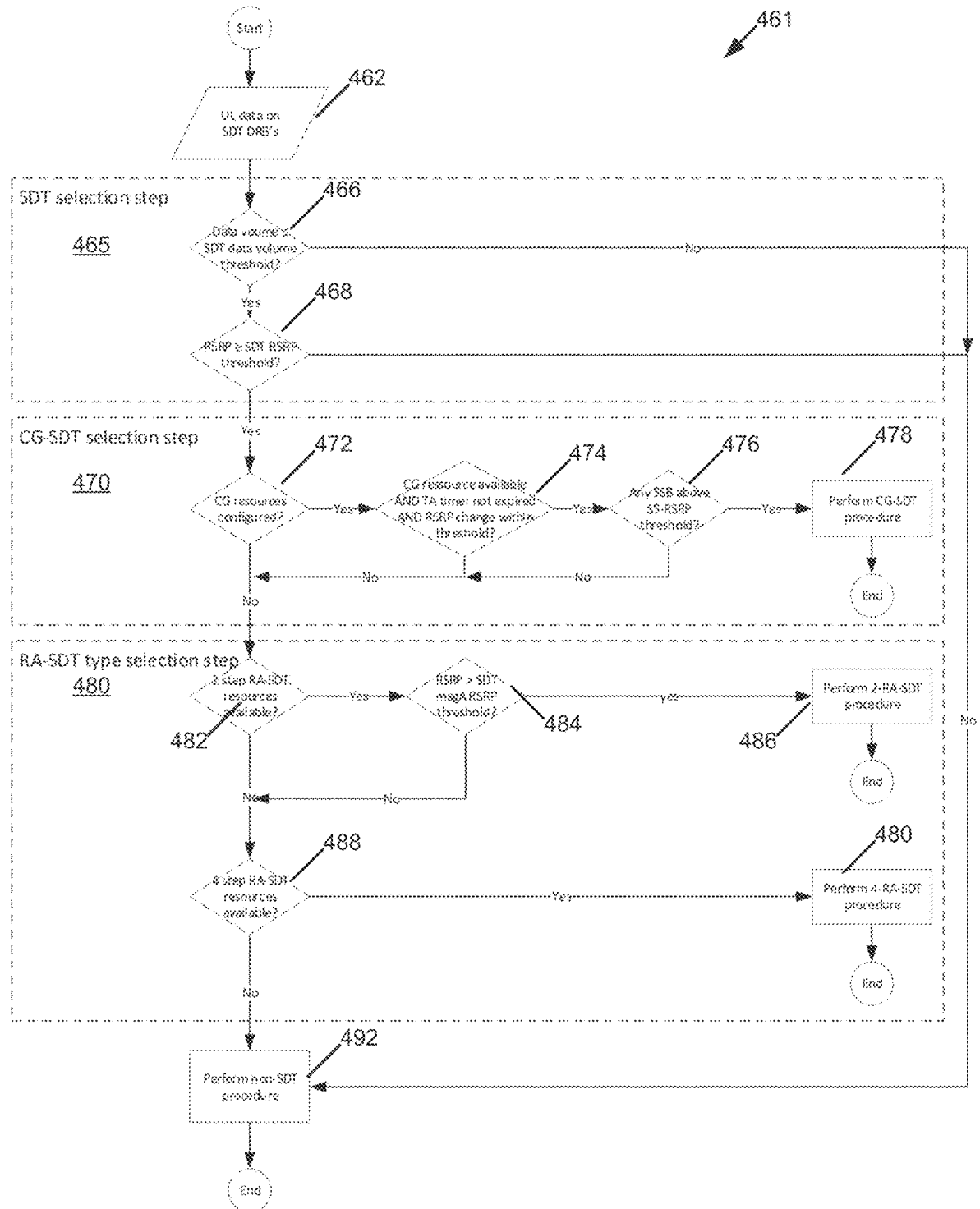
FIG. 4A is a logic flow diagram illustrating a flowchart for a decision tree on what SDT procedure, if any, to perform based on different parameters, in accordance with an exemplary embodiment.

Turning to FIG. 4A, this figure is a logic flow diagram illustrating a flowchart for a decision tree 461 on what SDT procedure, if any, to perform based on different parameters, in accordance with an exemplary embodiment. This logic flow diagram is performed by the UE 110. The flow is broadly viewed as three selection steps (a general SDT selection step 465, a CG-SDT selection step 470, and an RA-SDT type selection step 480) and a non-SDT selection (step 492).

The flow starts in block 462, where UL data is on SDT DRB(s). The SDT selection step 465 selects whether or not SDT will be performed. In block 466, it is determined whether data volume meets a threshold (in this example, is ≤SDT data volume threshold). If not (block 466=no), the flow proceeds to step 492, where a non-SDT procedure is performed. If so (block 466=yes), in block 468 the UE determines whether RSRP meets a threshold (i.e., is ≥SDT RSRP threshold in this example). If not (block 468=no), the flow proceeds to block 492. If so (block 468=yes), the flow proceeds to the CG-SDT selection step 470, which determines whether CG-SDT will be performed.

In CG-SDT selection step 470, in block 472, the UE determines whether CG resources are configured. If not (472=no), the flow proceeds to RA-SDT type selection step 480, which selects the type of RA-SDT procedure. If so (block 472=yes), the UE determines whether CG resources are available and a TA timer is not expired, and an RSRP change is within a threshold. If so (block 474=yes), the UE determines whether any SSB meets a threshold (e.g., is above an SS-RSRP threshold) and if so, the UE performs a CG-SDT procedure and the flow ends. If either block 474 or 476 are no, the flow proceeds to 480.

In the RA-SDT type selection step 480, the first block is block 482, where the UE determines whether 2 step RA-SDT resources are available. If so, the UE determines in block 484 whether an RSRP>SDT MsgA RSRP threshold in block 484. If so, the UE performs a 2-step RA-SDT procedure in block 478 and the flow ends.

If either block 482 or 484 is no, the flow proceeds to block 488, where the UE determines whether 4 step RA-SDT resources are available. If so, the UE performs a 4-step RA-SDT procedure in block 480, and the flow ends. If block 488 is no, the flow proceeds to block 492.

Exemplary differences between existing test loops (for example, loop mode B) and this one includes the ability to give an exact occasion for when the SDT session should be triggered and the ability to configure how much of the data that should be forwarded from the test function to the lower layers per SDT session. In this way, frames can be stored for later transmission over several SDT sessions without having to send data to the device during the test session, and all is handled in connected mode before the actual testing starts. The existing loopback message exchange is also currently performed only in RRC connected, so this implies that the SS and DUT can only communicate while the UE is in RRC connected. With Method 1, this limitation is overcome, since the loopback commands are indicating the actions that the DUT have to perform after it moves to RRC inactive.

Additionally, with this example, the same data can be used for every SDT session, meaning, if the purpose of the test is to verify the UE decisions for each of the SDT sessions, the actual data is indifferent. Therefore, the test loop command with a new loop type could store a fixed set of data used for every SDT session in the test. This is a clear advantage, since if repetitions were not allowed, the UE would need to transition to RRC connected before every new SDT transmission, and the testing time would be significantly increased or the device would need to store a larger amount of data during RRC inactive mode for later SDT transmission. Another method is to send data on the fly by giving the data to be transmitted in the downlink before or as part of the data holding the RRC release. This is not considered optimal, as it may violates the black box testing concept, and is therefore not considered further herein.

Figure 5:
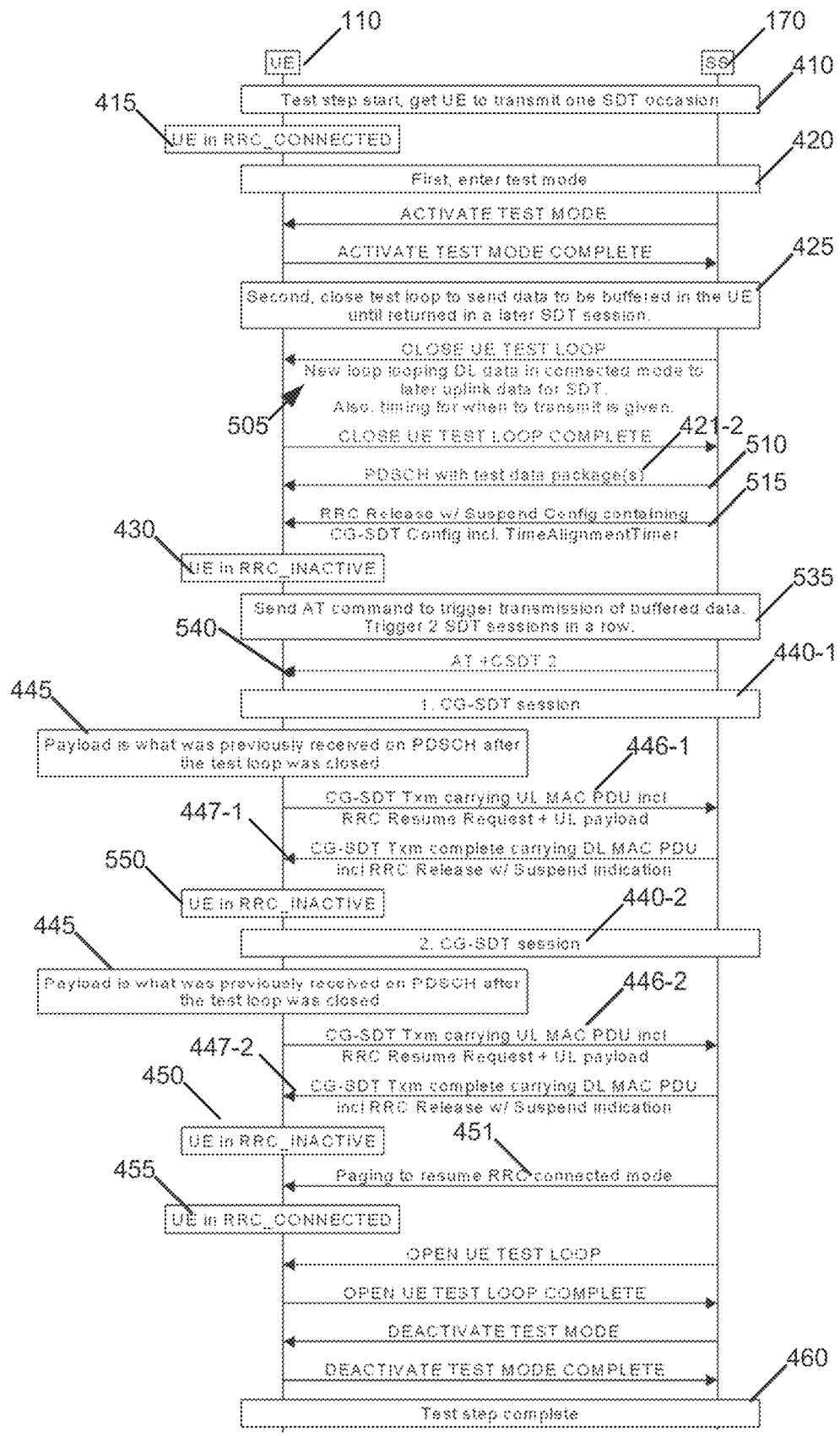
FIG. 5 illustrates a signaling and time diagram for a second exemplary method (Method 2) using test loop for testing SDT sessions supplemented by AT command(s) to trigger an SDT session, in accordance with an exemplary embodiment.

An alternative solution using loopback commands and AT commands is proposed in Method 2 and shown in FIG. 5. The solution in Method 2 has similar advantages as to the advantages of Method 1, but Method 2 solves the problems differently. The data used for SDT sessions is still transferred in loop back mode prior to the test execution, however the data is then triggered for SDT sessions using an AT command. The AT command itself can, besides number of SDT sessions, also be specified to hold timing information on the SDT sessions themselves as in the previous solution. One advantage of this solution in comparison to the method 1 is that it enables more flexible triggering of the SDT messages. It is noted that the command +CSDT is just an example name of a potential new AT command for this purpose, and other names or commands might be used.

In the Method 2 shown in FIG. 5, a combination of loopback and AT commands is proposed. The main steps that are involved in this alternative method are described as follows. Many of these steps or signaling have already been described with respect to FIG. 4. Block 410 indicates that the test step starts, by getting the UE 110 to transmit one SDT session.

Step 1. First, activate test mode. See block 420.

1.a. The SS 170 has to send an ACTIVATE TEST MODE loopback message indicating this activation. This message is sent over the air while the UE is RRC connected mode (see block 430).

1.b. This step enables the DUT (UE 110) to start to receive test commands, and the UE responds with an ACTIVATE TEST MODE COMPLETE message. In these examples, the UE 110 is considered to be the DUT.

Step 2. Close UE test loop, as indicated by signaling 505.

2.a. In this step (close UE test loop), the SS 170 indicates to the DUT 170 the test mode that is used for sending SDT in UL while in RRC inactive.

2.b. As part of the message sent to the DUT 110, the message may include the following.

2.b.i. Indication of the test mode using small data transmission. That is, existing test loop mode messages indicate which test mode is being configured at the UE, such as Test Loop Mode A, B, C, and the like for various purposes. This indication refers to a new extension to that message to configure this new proposed test mode.

2.b.ii. In one implementation option, the SS indicates the timing of the SDT transmissions in relation to the AT command of step 5 (described below). In another implementation option, the timing is indicated in the AT command of step 5.

2.c. The UE response with a CLOSE UE TEST LOOP COMPLETE message.

Step 3. PDSCH data transmission.

3.a. In this step, the SS sends a PDSCH with the test data package(s) 421 with payload(s) that should be used by the UE (see signaling 510, "PDSCH with test data package(s)") for testing.

Step 4. Move the UE to the RRC inactive state.

4.a. This step is accomplished by the SS by sending an RRC release with suspend to the UE. See signaling 515, "RRC Release w/ Suspend Config containing CG-SDT Configuration incl. TimeAlignmentTimer".

4.b. With this message, the UE transitions to the RRC inactive state (see block 430), and receives the configuration for SDT.

Step 5. The SS sends AT command to initiate SDT communication.

5.a. This AT command triggers the UE to start transmitting using SDT. In the example, the AT command triggers 2 SDT transmissions, one after the other. The triggering of the 2 SDT transmissions (see 440-1 and 440-2) via the AT command is indicated by the "AT+CSDT 2" in signaling 540. It is noted that the decision tree of FIG. 4A may also be used, in order to select the SDT type. This example has a single AT command (in signaling 540) that triggers multiple transmissions, in this case two transmissions 446-1 and 446-2. That is, multiple transmissions 446 may be triggered by a single AT command.

5.b. In one implementation option, the SS indicates in step 2 (e.g., blocks 425, 505) the timing of the SDT transmissions in relation to the AT command. In another implementation option, the timing is indicated as part of the AT command (e.g., in block 535 and signaling 540).

5.c. If the transmit power used by the SS allows for CG-SDT transmission, the UE will transmit the payload sent in PDSCH during step 3 using CG-SDT, otherwise the UE will use RA-SDT if the related criteria allow for it. The SS may also not configure RA-SDT resources forcing the UE to use only CG-SDT resources and vice versa. This is indicated by block 445 ("Payload is what was previously received on PDSCH after the test loop was closed"), signaling 446

("CG-SDT Txm (transmission) carrying UL MAC PDU incl RRC Resume Request+UL payload"), and signaling 447 ("CG-SDT Txm complete carrying DL MAC PDU incl RRC Release w/ Suspend indication"). Note that the payload is what was defined by (e.g., included in) the test package(s) 421-2.

5.d. This procedure may be repeated as long as the UE is in RRC inactive state (see block 450). That is, the AT command (from signaling 540) may be transmitted multiple times as long as the UE is in RRC inactive state. In this example, there are multiple blocks 430, 550, and 450, which indicate the UE is in RRC_INACTIVE mode, and these are to clarify that the UE stays in this state for this example.

Step 6. The SS pages the UE.

6.a. This step is used for the UE to come back into RRC connected mode (see block 455), and enable further loopback commands See signaling 451 ("Paging to resume RRC connected mode").

Step 7. Conclusion of the testing mode.

7.a. The UE is in the RRC_Connected mode (see block 455) after the paging, and the SS 170 sends an OPEN UE TEST LOOP message, which deactivates the test loop. The UE responds with an OPEN UE TEST LOOP COMPLETE message.

7.b. The SS sends a DEACTIVATE TEST MODE message, after which the UE deactivates the test mode and returns to normal operation. The UE responds with a DEACTIVATE TEST MODE COMPLETE message.

The test step is now complete. See block 460.

Figure 6:
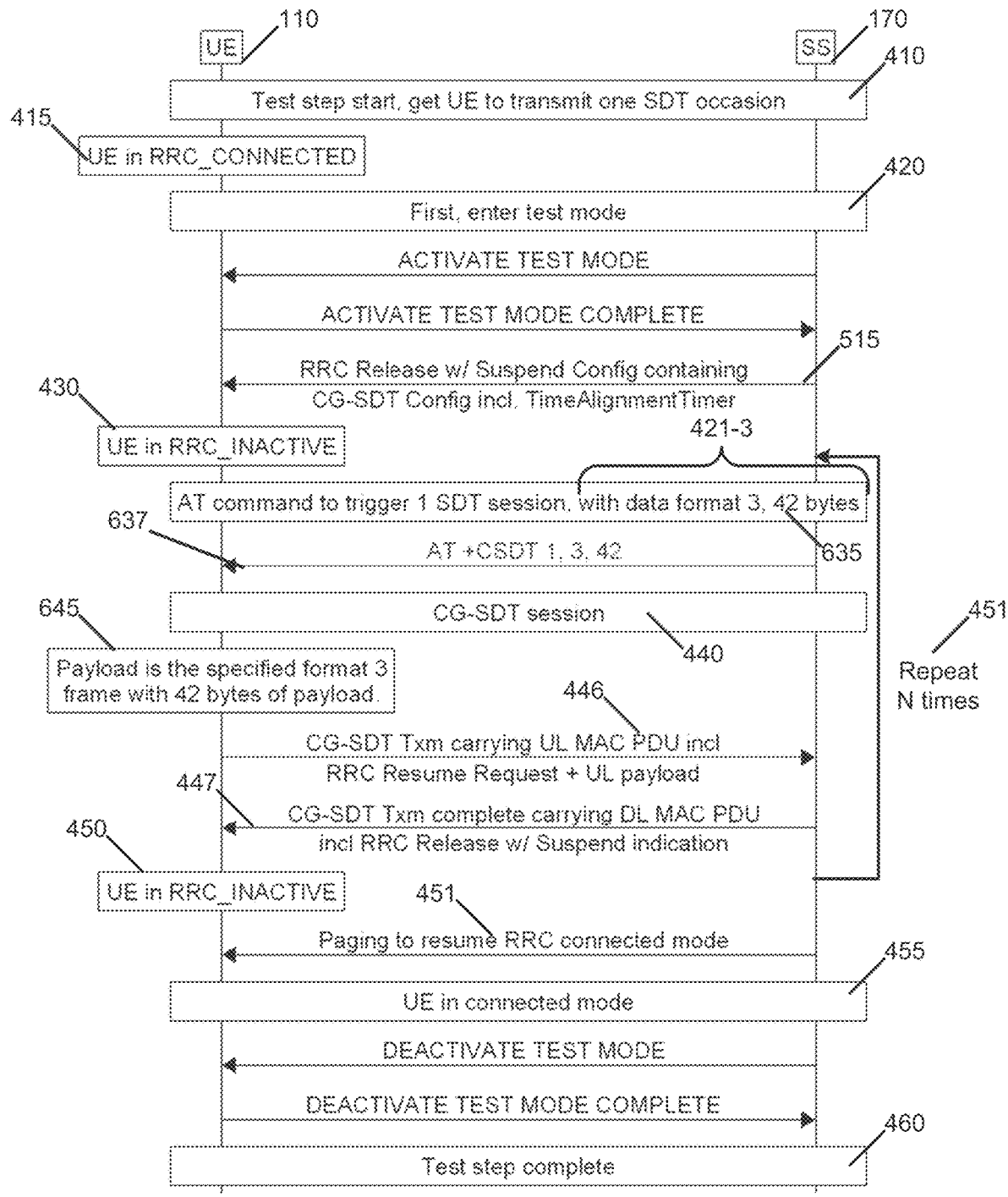
FIG. 6 illustrates a signaling and time diagram for an example using an AT command alone to send a predefined SDT test package, in accordance with an exemplary embodiment.

Another example is illustrated as Method 3, which is shown in FIG. 6 and has the same advantages as previously mentioned for Methods 1 and 2, but does further have the advantage of not having to store any loop-back data. Instead, the data is generated on the fly by (e.g., a test entity in) the UE. In this example, the AT command is specified to provide a number of SDT sessions to be triggered, the format of the data sent and last the number of bytes in the transmission. The main steps that are involved in this alternative method are described as follows. Many of the steps and signaling in FIG. 6 are similar to what was in FIGS. 4 and 5. Block 410 indicates that the test step starts, by getting the UE 110 to transmit one SDT session.

In this example, there may no loop. Instead, the data to send in SDT is not a loop back of data receive OTA, but a transmission of data specified by the AT command itself, i.e., in this example, (e.g., the test entity of) the UE generates the data itself. The data could also be provided in the AT command itself. Additionally, test mode may not be activation, though it still may make sense to activate test mode, e.g., so as to allow the AT commands in the UE.

Step 1. First, (optionally) activate test mode. See block 420.

1.a. The SS 170 has to send an ACTIVATE TEST MODE loopback message indicating this activation. This message is sent over the air while the UE is RRC connected mode (see block 415).

1.b. This step enables the DUT (UE 110) to start to receive test commands, and the UE responds with an ACTIVATE TEST MODE COMPLETE message. In these examples, the UE 110 is considered to be the DUT.

Step 2. Move the UE to the RRC inactive state.

2.a. This step is accomplished by the SS 170 by sending an RRC release with suspend to the UE. See signaling 515, where the SS 170 sends an RRC Release with (w/) Suspend Configuration (Config) containing CG-SDT Configuration (Config) including (incl.) TimeAlignmentTimer.

2.b. With this message, the UE transitions to the RRC inactive state (see block 430), and receives the configuration for SDT.

Step 3. SS sends AT command to initiate SDT communication.

3.a. This AT command (see block 635) triggers the UE to start transmitting using SDT (see block 635, "AT command to trigger 1 SDT session), and may include a predefined SDT test package 421-3 (see block 635, "with data format 3, 42 bytes"), and signaling 637, "AT+CSDT 1, 3, 42"), comprising:

3.a.i. Data format (e.g., data format 3 in this example);

3.a.ii. Payload to be generated (e.g., 42 bytes in this example); and/or 3.a.iii. Number of SDT sessions (e.g., one CSDT session indicated).

3.b. If the transmit power used by the SS allows for SDT transmission, according to the SDT decision tree (see FIG. 4A) and TA validation criteria, the UE will perform the following (see block 645, "Payload is the specified format 3 frame with 42 bytes of payload"):

3.b.i. Generate a random payload with the number of bits configured in the AT command, where in this case the payload is defined by the test data package 421-3;

3.b.ii. Transmit the payload via CG-SDT or RA-SDT (see, for this example, signaling 446 ("CG-SDT Txm carrying UL MAC PDU incl RRC Resume Request+UL payload"), and also the response from the SS in signaling 447 (of "CG-SDT Txm complete carrying DL MAC PDU incl RRC Release w/ Suspend indication");

3.b.iii. Transmit again the payload for the repetitions configured in the AT command See reference 451 (e.g., Repeat N times).

3.c. The system simulator may initiate this procedure again as long as the UE is in test mode an in the RRC inactive state and initiated by sending a new AT command.

The UE remains in the RRC_INACTIVE mode. The blocks 430 and 450 are used to illustrate the UE is still in RRC inactive between 446 and 447, and to make it clear that the UE has not changed state. In other non-SDT contexts, the UE could send an RRC resume request to ask to be again placed into RRC connected, but this is not the case in this figure.

Step 4. SS moves the UE to RRC connected.

4.a. SS sends a paging message to the UE (see signaling 451, "Paging to resume RRC connected mode"). This step is used for the UE to come back into the RRC connected mode (see block 455, "UE in connected mode"), and enable further loopback commands.

5. Conclusion of the testing mode.

5.a. The SS sends a DEACTIVATE TEST MODE message, after which the UE deactivates the test mode and returns to normal operation (and sends a DEACTIVATE TEST MODE COMPLETE message).

At this point, the test step is complete (see block 460).

When compared to Methods 1 and 2, the Method 3 has an advantage because this method does not require the SS to send PDSCH containing the payload to be transmitted by the UE. Additionally, since the AT command would include the payload size, multiple SDT sessions could be triggered with different sizes without the need to move the UE to RRC connected mode. That would imply a faster test procedure in case many test cases that are concatenated (as it is time consuming for a UE to move to RRC connected mode). For example, this enables the SS to verify if the UE correctly moves to RRC connected in case the amount of data to transmit exceeds the maximum threshold for SDT transmissions.

An advantage of Method 1, compared to Methods 2 and 3, is that the system simulator 170 does not need a second interface to the UE; instead, the SS 170 only needs the air interface that is under test anyway.

Any of the above solutions could be extended to allow the triggering of sub-sequent SDT transmissions—SDT sessions with more uplink transmissions than one.

Lastly, it should be noted that the examples all show CG-SDT sessions, but the examples can also force the choice between CG-SDT and RA-SDT transmissions if not given by the channel configuration itself in the test. For example, to test the device correctly choose between CG-SDT and RA-SDT sessions.

Without in any way limiting the scope, interpretation, or application of the claims appearing below, a technical effect and advantage of one or more of the example embodiments disclosed herein is enablement of easy verification of the CG-SDT functionality through loopback or AT command interfaces. Another technical effect of one or more of the example embodiments disclosed herein is new testing mode commands that can control the UE behavior also when the UE is in RRC inactive or RRC idle is developed, and a provision of a good level of control for the SS on when the CG-SDT transmissions are triggered.

III. Examples Related to Testing Methods for Verification of TA Validation of CG-SDT This section relates to testing methods for verification of TA validation of CG-SDT.

III.a. Introduction of the Technical Area

Figures 7, 7A, 7B:
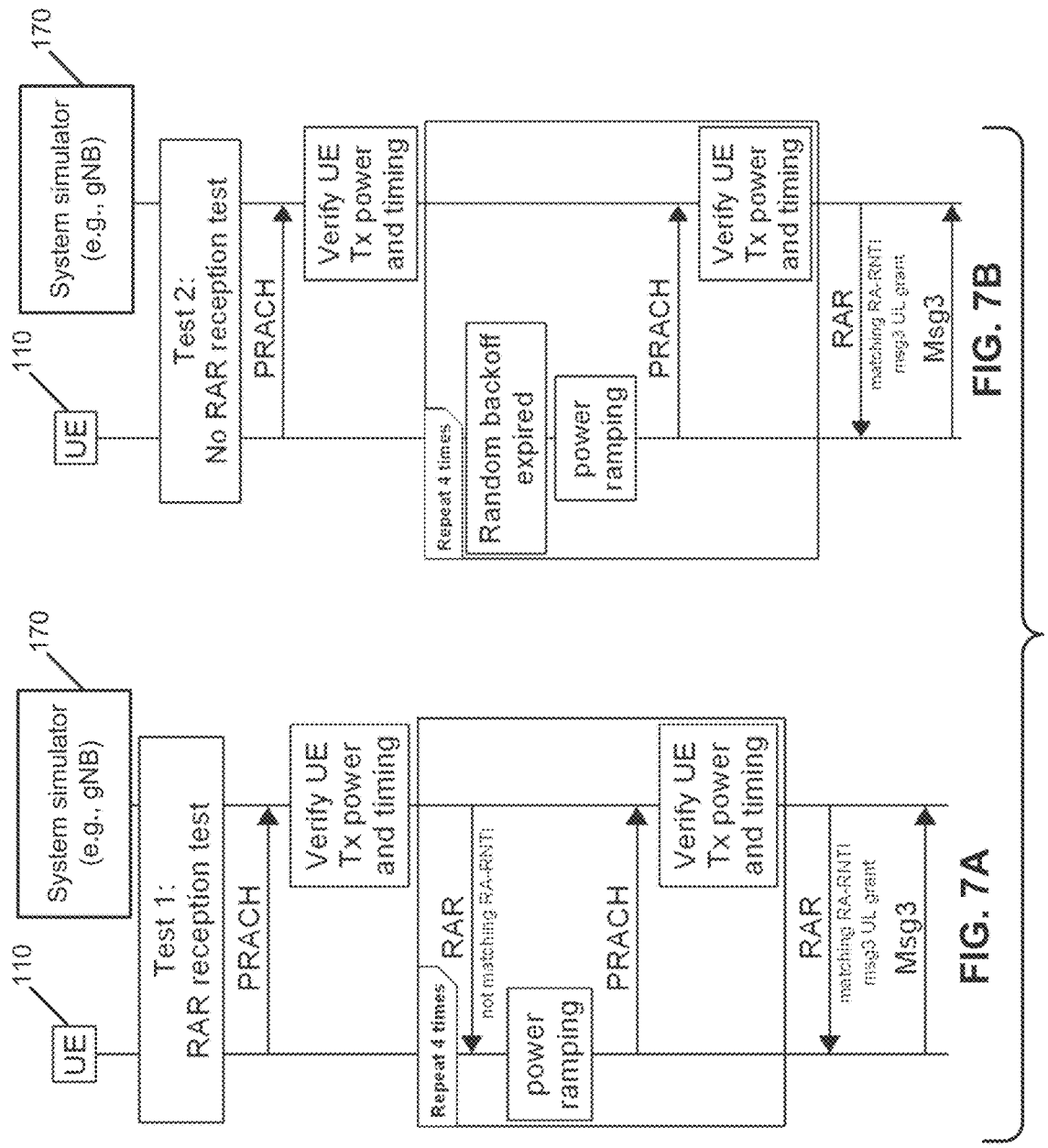
FIG. 7, split into
FIG. 7A and FIG. 7B, illustrates diagrams showing testing method used for random access procedures, where

In addition to the introduction in II.a. above, this section provides additional introduction specific to this testing methods for verification of TA validation of CG-SDT. Turning to FIG. 7, split into FIG. 7A and FIG. 7B, this figure illustrates diagrams showing testing method used for random access procedures. FIG. 7A illustrates a Test 1 and FIG. 7B illustrates a Test 2. FIG. 7 illustrates an example of another RRM test case. In this example, the UE is triggered to send PRACH preambles while in RRC connected mode. Two variants of this test are specified. In Test 1 (FIG. 7A), the behavior after receiving a random-access response RAR with no matching RNTI is evaluated, while in Test 2 (FIG. 7B), the behavior of the UE that does not receive any RAR is evaluated.

As indicated in FIG. 7A, the UE 110 performs a PRACH procedure, and the test equipment, e.g., a gNB, 170 verifies Tx power and timing. The following are repeated four times: The SS 170 sends an RAR not matching RA-RNTI, the UE 110 performs power ramping and then performs another PRACH procedure, and the SS 170 again verifies UE Tx power and timing. The SS 170 sends another RAR, this time matching RA-RNTI msg3 grant, and the UE responds with Msg3.

FIG. 7B is similar to FIG. 7A, and differences are mainly described. For the repetition part, the UE has a random backoff that expires, then the UE performs power ramping.

In both cases, after each PRACH transmission the SS verifies the transmit power and timing accuracy.

There are challenges on how TA validation procedure can be verified by test cases. The existing RRM test cases rely mostly on random-access messages, and dynamic grants, but none of the existing RRM test cases specified in 3GPP TS 38.133 include configured grants.

In order to ensure good quality commercial deployment of the SDT feature, it is important that conformance tests are able to verify the following aspects:
1) Verify that the UE respects the windows where the measurements should be performed.
2) Verify that CG-SDT transmissions are only performed when the TA validation conditions allow for the transmissions.
3) Verify that CG-SDT transmissions do not exceed the maximum UL timing accuracy.

In order to achieve the above aspects, solutions should be found for a test equipment SS and a UE in that enables the verification that the conditions for CG-SDT hold and transmissions are with the specified accuracy.

III.b. Examples for Testing Methods for Verification of TA Validation of CG-SDT

The examples herein describe a test method which is used to verify the behavior of UEs using CG-SDT. CG-SDT uses two RSRP windows, from which the RSRP levels are compared in order to determine if the UE is allowed to transmit in CG-SDT. Considering that scenario, a test method is developed that verifies if the UE is indeed obtaining RSRP values within the specified windows.

Figure 9:
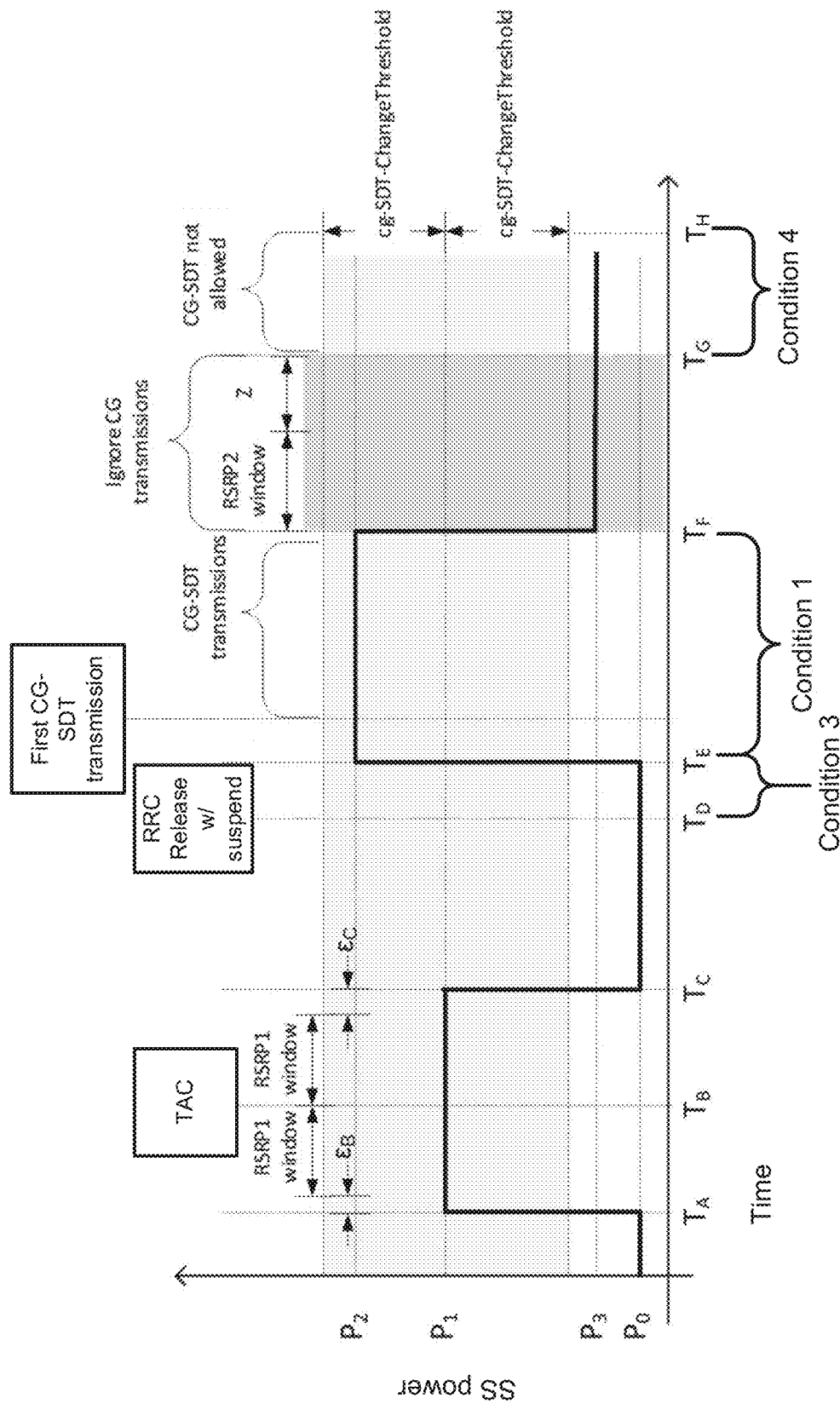
FIG. 9 illustrates an example of SS power over time for the test procedure as used in FIG. 8, in an exemplary embodiment.

In order to achieve that objective, the test equipment changes the transmit power in the times when the UE was following the requirements for TA validation. Refer to FIG. 9, which illustrates test equipment power relative to the TA validation conditions when considering $P_1$, power applied during the first RSRP measurement window, $P_0$, and the SS power during RRC connected mode outside of the first RSRP window. The test starts with a power level $P_0$, which is changed to $P_1$ during the measurement window which should be used by the UE for measuring RSRP1. The SS power is changed back to $P_0$. It is noted that a measurement window is a time period during which a measurement is (or measurements are) expected to be performed.

As a second step, the test equipment moves the UE to RRC inactive, and changes the power levels to values during predefined time intervals such that one of the following conditions are met:
1) Condition 1: The TA validation condition is satisfied, i.e. the SS transmit power in the second RSRP window P is such that $|P_1-P|<$cg-SDT-ChangeThreshold, and CG-SDT is allowed.
2) Condition 2: The TA validation condition is not satisfied, i.e. the SS transmit power in the second RSRP window P is such that $|P_1-P|>$cg-SDT-ChangeThreshold, and CG-SDT is NOT allowed.
3) Condition 3: The TA validation condition is not satisfied, i.e. the SS transmit power in the second RSRP window P is such that $|P_1-P|>$cg-SDT-ChangeThreshold, and CG-SDT is NOT allowed, and P is chosen such that if RSRP1 is measured outside of the window the TA validation condition would be satisfied, i.e., $|P_0-P|<$cg-SDT-ChangeThreshold. This step is used to verify if the UE measured RSRP1 outside the measurement window.
4) Condition 4: The TA validation condition is not satisfied and, i.e., the SS transmit power in the second RSRP window P is such that $|P_1-P|>$cg-SDT-ChangeThreshold, and CG-SDT is NOT allowed. Additionally, the SS transmit power before Px the start of the RSRP2 measurement window is chosen such that $|P_1-Px|<$cg-SDT-ChangeThreshold. This condition is used to verify if the UE has measured RSRP2 outside the measurement window.

The SS-transmitted values for Condition 1 are used to verify if the UE is able to transmit on CG-SDT when the TA validation is valid. During times when Condition 1 is valid, the SS verifies that the UE is transmitting CG-SDT. During times when Condition 2 is valid, the SS verifies that no transmission of CG-SDT is performed by the UE, and if the UE transmits a CG-SDT the UE has failed the test. Condition 3 includes an additional check in relation to Condition 2, which verifies if the first RSRP measurement was obtained inside the correct measurement window by the UE. Likewise, Condition 4 includes an additional chek in comparison to condition 2, which verifies if the second RSRP measurement was obtained inside the correct measurement window by the UE. Please notice that the combination of these conditions during the test procedure allow the system simulator to identify if the UE has performed the correct measurement, if the measurements were collected at the correct measurement windows, and it would verify if the UE only sends CG-SDT when the UE is allowed to do so.

Figure 8A:
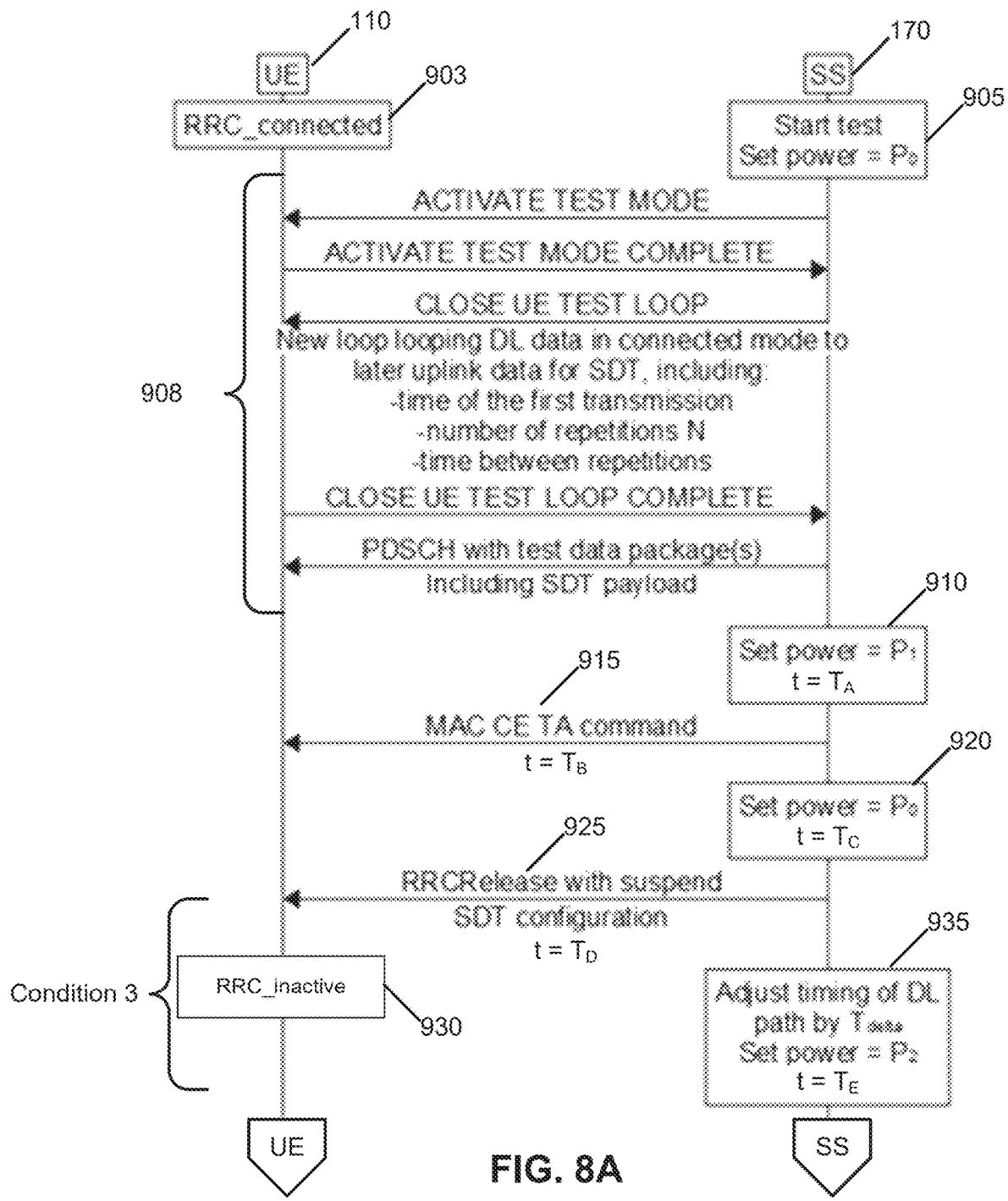
FIGS. 8A and 8B, is a sequence diagram describing the test case steps for verification of TA validation of CG-SDT in an exemplary embodiment.
Figure 8B:
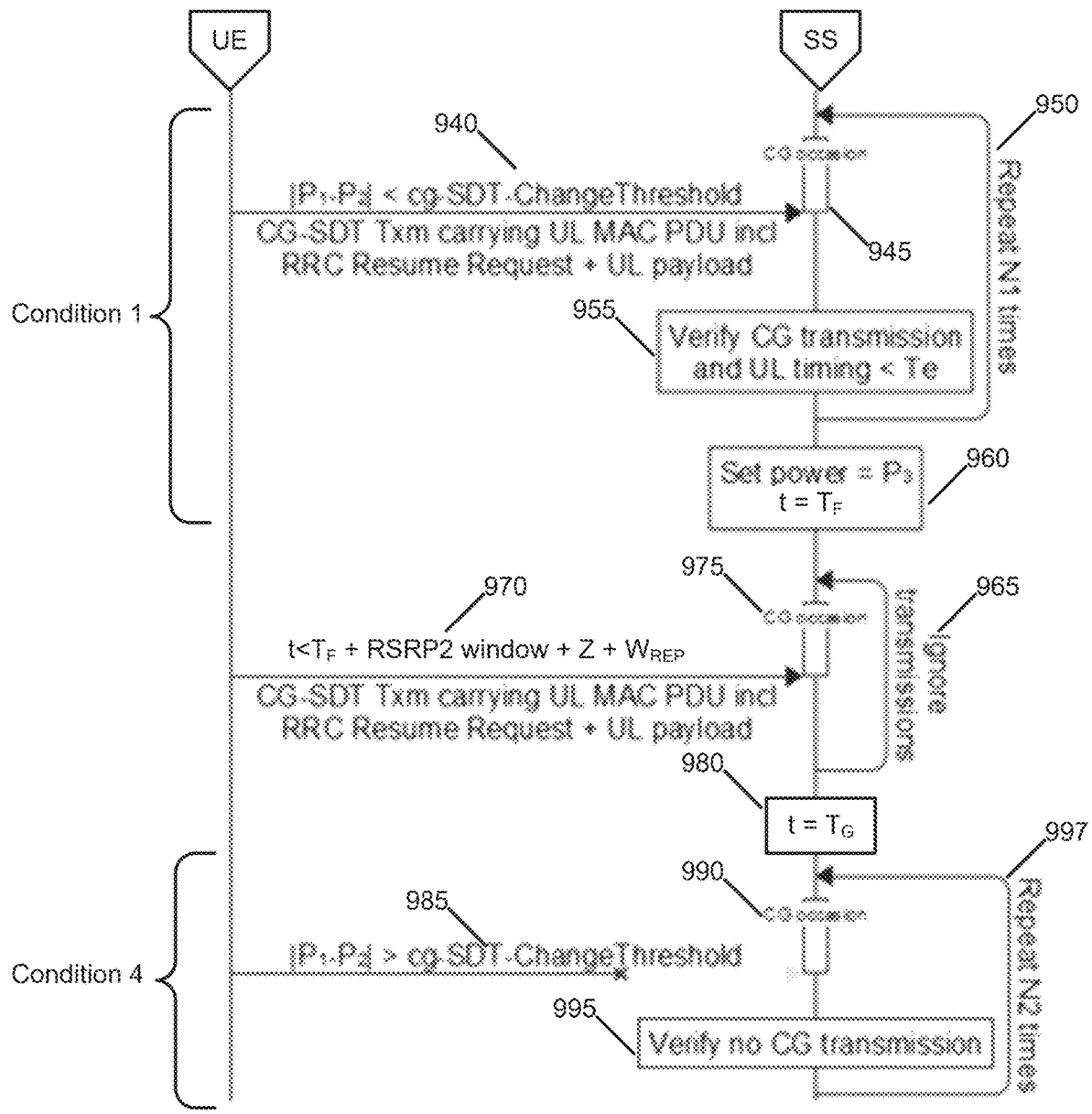

FIG. 8, which is spread over FIGS. 8A and 8B, is a sequence diagram describing the test case steps for verification of TA validation of CG-SDT in an exemplary embodiment This figure shows the steps involved in the CG-SDT testing considering power levels $P_0$, $P_1$, $P_2$, and $P_3$. An example for possible power values for $P_0, \ldots, P_3$ is shown in FIG. 9. It is noted that the decision tree of FIG. 4A may also be used, in order to select the SDT type. Additionally, this figure is assumed to be an adjunct to other figures, thereby combining the methods for transmitted payloads would be defined either in FIG. 4, 5 or 6. That is, it is expected that FIG. 4, 5 or 6 are used to configure the UE to start sending SDT transmissions, and in FIG. 8 the testing steps are verified. That means, if one uses Method 1 (FIG. 4), the SS would activate the test mode, close the test loop, and send the test data package to be used by the UE. After that the UE would be expected to send SDT packages as in FIG. 8. For ease of reference, FIG. 4 is assumed to be combined with the techniques of FIG. 8, but the configuring performed in FIG. 5 or 6 might be used instead.

The steps can be further described as follows, illustrated in FIG. 8.

Step 1: The test starts with the UE in RRC connected mode (block 903), and with the SS 170 setting (block 905) a power level of $P_0$. Reference 908 indicates examples of configuring that can be performed from FIG. 4. See FIG. 4 for more details.

Step 2: At time $t=T_A$ the SS 170 sets (block 910) the power level to $P_1$. $P_1$ is chosen as $|P_0-P_1|>$cg-SDT-ChangeThreshold.

Step 3: The SS 170 sends a TAC at time $t=T_B \geq T_A + W_{RSRP1}$. This is indicated by the signaling 915, "MAC CE TA command" at $t=T_B$.

Step 4: At time $t=T_C$ the SS 170 sets (block 920) the power level to $P_0$.

a. $T_A$, $T_B$ and $T_C$ are chosen via the following: $T_B=T_A+W_{RSRP1}+W_{REP}-\varepsilon_B$, and $T_C=T_B+W_{RSRP1}+W_{REP}+\varepsilon_C$, where $W_{RSRP1}$ is the window to measure the first RSRP value, $W_{REP}$ accounts for the measurement repetitions needed for the measurement of the RSRP, and $\varepsilon_B$ and $\varepsilon_C$ should be close to zero and are used to consider limitations on when the TAC may be sent and power can be changed by the test equipment.

Step 5: At time $t=T_D$, the SS 170 sends (signaling 925) an RRC release with suspend message to the UE including the SDT configuration. The Condition 3 is used between $T_D$ and $T_E$, as described in more detail in reference to FIG. 9.

a. In response to this message, the UE goes to the RRC inactive mode (block 930). CG-SDT are still not allowed, since the SS power will result in an RSRP variation above the cg-SDT-ChangeThreshold, i.e., $|P_0-P_1|>$cg-SDT-ChangeThreshold. At this time, if the UE transmits CG-SDT, the test run is considered as failed.

Step 6: At time $t=T_E$, the SS 170 then sets (block 935) the transmit power as $P_2$ and adjusts the DL transmit timing by $T_{DELTA}$. $P_2$ is chosen such that the TA validation conditions allow for a CG-SDT transmission, i.e., $|P_2-P_1|<$cg-SDT-ChangeThreshold. $T_{DELTA}$ is used to verify if the UE 110 is able to adapt to the DL timing during the CG-SDT transmissions.

Step 7: The SS 170 should wait for N1 CG-SDT transmissions, which should occur during the CG occasion 945. The Condition 1 is used between $T_D$ and $T_E$, as described in more detail in reference to FIG. 9.

7.a. The SS should verify (block 955) that the CG-SDT transmissions (indicated by the signaling 940 from the UE 110 to the SS 170 with $|P_1-P_2|<$cg-SDT-ChangeThreshold) have a transmit power within the power accuracy, and that the UL transmit timing error is smaller than Te (e.g., as specified in section 7.1 of 3GPP TS 38.133). For the example, there is a CG-SDT transmission (TXm) carrying UL MAC PDU including (incl) RRC Resume Request and an UL payload (as described in more detail in reference to FIG. 4). This process is repeated N1 times, N1≥1, see block 950. The signaling 940 may be considered to be a test data package transmitted by the UE. At this time, if the UE transmits CG-SDT and the transmit power or the transmit timing error exceed the limits described above the test run is considered as failed.

Step 8: At time $t=T_F$ the SS 170 sets (block 960) the power to $P_3$. $P_3$ is chosen as $|P_1-P_3|>$cg-SDT-ChangeThreshold, i.e., CG-SDT transmissions are allowed since the UE should not pass the $T_A$ validation requirements. At this time, the testing condition 4 is met, which means that if the UE uses a measurement for RSRP2 outside the measurement window, the UE will transmit on CG-SDT occasion 975 and fail the test. Additionally, $P_3$ may be also be chosen as $|P_0-P_3|<$cg-SDT-ChangeThreshold. In this case, if the UE is measuring the first RSRP value outside of the valid measurement window, the UE would potentially pass the $T_A$ validation requirement and send CG-SDT (see condition 3). The SS 170 should ignore CG-SDT transmissions (see block 965) in the CG occasion for a time equivalent to $W_{RSRP2}+Z+W_{REP}$, where $W_{RSRP2}$ is the length of the second RSRP window (i.e., $T_F$ RSRP2 window, as shown in signaling 970 in FIG. 8), Z is the time between the $T_A$ validation decision and the CG-SDT occasion, and $W_{REP}$ accounts for the measurement repetitions needed for the measurement of the RSRP. The signaling 970 may be considered to be a test data package transmitted by the UE. For the example, there is a CG-SDT transmission (TXm) carrying UL MAC PDU including (incl) RRC Resume Request and an UL payload (as described in more detail in reference to FIG. 4). These transmissions should be ignored (indicated by "ignore transmissions"), since the UE might still have a valid measurement on the second RSRP window that passes the TA validation criteria.

Step 9: After time $t=T_G$ (block 980), CG-SDT transmissions are not allowed anymore. $T_G=T_F W_{RSRP2}+Z+W_{REP}$. At this time, if the UE transmits CG-SDT, e.g., in CG occasion 990, the test run is considered as failed. This is indicated by the signaling 985, with $|P_1-P_s|>$cg-SDT-ChangeThreshold that ends with an "x". The SS 170 verifies (block 995) there are no CG-SDT transmissions. The time between $T_G$ and the end of the test should be large enough such that it contains N2≥1 CG-SDT occasions, as indicated by block 997.

It is noted that the threshold comparisons performed herein can be characterized as meeting a threshold. As one example, the $|P_0-P_3|<$cg-SDT-ChangeThreshold comparison is used above. This may be more broadly characterizes as the $|P_0-P_3|$ meets a threshold, which is being less than cg-SDT-ChangeThreshold.

Turning to FIG. 9, this figure illustrates an example of SS power over time for the test procedure as used in FIG. 8, in an exemplary embodiment, and illustrates further the variation power levels that should be applied by the SS for each part of the test. In this figure, it is shown how the power levels after the UE is in RRC inactive mode in $T_D$ are adjusted to fit the conditions described:

Condition 1: between $T_E$ and $T_F$;
Condition 3: between $T_D$ and $T_E$;
Condition 4: between $T_G$ and the end of the test;

Condition 2 is not used in this diagram since condition 3 and condition 4 are strict and enough for the test coverage, but the same times used for condition 3 and condition 4 could apply for condition 2 as well.

As a reminder, for these examples, only for Condition 1, the TA validation condition is satisfied, i.e., $|P_1-P_2|<$cg-SDT-ChangeThreshold, and CG-SDT is allowed; for Condition 3 and Condition 4 the TA validation condition is not satisfied, i.e., $|P_1-P_0|>$cg-SDT-ChangeThreshold, and CG-SDT is NOT allowed. Conditions 1, 3, and 4 are indicated in FIG. 9.

The TAC is sent by the SS 170 at time $T_B$ is illustrated in FIG. 8 and FIG. 9, which is centered at the first RSRP window, as is the RRC Release w/ suspend at time $T_D$, and the first CG-SDT transmission by the UE (which occurs after $T_E$). FIG. 9 illustrates also the times when the SS should ignore eventual CG-SDT transmissions between $T_F$ and $T_G$. Since the exact time when the UE performs the RSRP measurement is not mandated for the UEs, in this time interval there is a chance that the UE passes and fails the TA validation criteria and still conforms to the specification, therefore the SS 170 should allow for transmissions in this time interval.

Without in any way limiting the scope, interpretation, or application of the claims appearing below, technical effects and advantage of one or more of the example embodiments disclosed herein include the following for enabling verification of the TA validation mechanism where:

1) SS transmit power levels are adjusted so that it is ensured that the UE is using the correct procedure for TA validation.
2) The power during RRC connected is set such that the transmit power level during the first RSRP measurement window is set such that if the UE measures outside this window, the UE will not be able to transmit on the times it is expected to transmit in CG-SDT while in RRC inactive mode;
3) The power while the UE is in RRC inactive is set such that
   a) The UE will only be able to transmit in the correct CG-SDT occasions if the UE has measured RSRP1 inside the measurement window and RSRP2 inside the second RSRP window; and/or
   b) Failure to measure in the correct time will cause the UE to transmit in CG-SDT occasions where it should not be allowed to transmit.

IV. Other Exemplary Considerations

As used in this application, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:
- 3GPP third generation partnership project
- 5G fifth generation
- 5GC 5G core network
- AMF access and mobility management function
- AT ATtention! command prefix for modem control, also known as Hayes commands
- CG configured grant
- CG-SDT configured grant-SDT
- CMD command
- CU central unit
- DL downlink (from network to UE)
- DRB data radio bearer
- DU distributed unit
- DUT device under test
- eNB (or eNodeB) evolved Node B (e.g., an LTE base station)
- EN-DC E-UTRA-NR dual connectivity
- en-gNB or En-gNB node providing NR user plane and control plane protocol terminations towards the UE, and acting as secondary node in EN-DC
- E-UTRA evolved universal terrestrial radio access, i.e., the LTE radio access technology
- FR2 frequency range 2
- gNB (or gNodeB) base station for 5G/NR, i.e., a node providing NR user plane and control plane protocol terminations towards the UE, and connected via the NG interface to the 5GC
- I/F interface
- incl or incl. including
- LTE long term evolution
- MAC medium access control
- MME mobility management entity
- MT mobile termination
- ng or NG next generation
- ng-eNB or NG-eNB next generation eNB
- NR new radio
- N/W or NW network
- OTA over the air
- PCell primary cell
- PDCP packet data convergence protocol
- PDSCH physical downlink shared channel
- PDU protocol data unit
- PHY physical layer
- PRACH physical random access channel
- RA random access
- RAN radio access network
- RAR random access response
- RA-RNTI random access-radio network temporary identifier
- Rel release
- RLC radio link control
- RRC radio resource control
- RRH remote radio head
- RRM radio resource management
- RSRP Reference Signal Received Power
- RU radio unit
- Rx receiver
- SCS subcarrier spacing
- SDAP service data adaptation protocol
- SDT small data transmission
- SGW serving gateway
- SMF session management function
- SRS sounding reference signal
- SS system simulator
- SSB synchronization signal block
- TA timing advance
- TAC timing advance command
- TS technical specification
- TST test
- Tx transmitter or transmit
- Txm transmission
- UE user equipment (e.g., a wireless, typically mobile device)
- UL uplink (from UE to network)
- UPF user plane function
- V2X vehicle to everything
- w/ with

What is claimed is:

1. An apparatus, comprising:
one or more processors; and
one or more memories storing instructions that, when executed by the one or more processors, cause the apparatus to:
configure a user equipment, by transmission from the apparatus, at least part of a procedure of performance testing of a data transmission to be performed while the user equipment is in a radio resource control inactive state; and
perform, by the apparatus, the at least part of the procedure of performance testing of the data transmission while the user equipment is in the radio resource control inactive state;
wherein the at least part of the procedure of performance testing includes at least one of:
triggering the data transmission while the user equipment is in the radio resource control inactive state;
transmitting one or more test data packages;
controlling time that the user equipment starts to transmit, while in the radio resource control inactive state, payload corresponding to at least one of the one or more test data packages;
verifying whether or not conditions for the data transmission are met; or
determining whether or not the user equipment passed the performance testing, based on a result of the verification of whether or not conditions for the data transmission are met.

2. An apparatus, comprising:
one or more processors; and
one or more memories storing instructions that, when executed by the one or more processors, cause the apparatus to:
receive, at the apparatus, a configuration of at least part of a procedure of performance testing of data transmission, the procedure of performance testing to be performed while the apparatus is in a radio resource control inactive state; and
perform, at the apparatus, based on the configuration, the at least part of the procedure of performance testing of data transmission while the apparatus is in the radio resource control inactive state,
wherein the at least part of the procedure of performance testing includes at least one of:
receiving signaling of triggering the data transmission;
receiving one or more test data packages;
starting to transmit payload corresponding to at least one of the received one or more test data packages in radio resource control inactive state, based on the configuration; or transmitting one or more measurement results based on one or more corresponding measurements made at the apparatus.

3. The apparatus according to claim 1, wherein the data transmission comprises at least one of a small data transmission, a configured grant-small data transmission, a two-step random-access-small data transmission, or a four-step random-access-small data transmission.

4. The apparatus according to claim 1, wherein the one or more test data packages comprises one or more of the following:
time of a first data transmission to be performed at the user equipment;
a number of repetitions data transmissions to be performed at the user equipment; or
time between the repetitions.

5. The apparatus according to claim 1, wherein one or more triggers used to determine when to perform the data transmission comprise timing information for at least a first data transmission.

6. The apparatus according to claim 1, wherein the one or more test data packages comprises one or more of the following:
indication of a test mode to be used at the apparatus; or
indication of timing of the data transmissions in relation to a command used to trigger the data transmission.

7. The apparatus according to claim 1, wherein one or more triggers used to determine when to perform the data transmission comprise corresponding one or more commands from the apparatus to the user equipment.

8. The apparatus according to claim 1, wherein the one or more test data packages comprises one or more of the following:
indication of how many data transmissions are to be performed;
indication of at least one of multiple data formats; or
indication of how many bytes are to be used for the data transmissions.

9. The apparatus according to claim 2, wherein one or more triggers used to determine when to perform the data transmission comprise corresponding one or more commands from a testing equipment to the apparatus.

10. The apparatus according to claim 1, wherein the performance testing determines whether the apparatus obtains values of reference signal received power within specified measurement windows, wherein multiple power levels are used for different measurement windows.

11. The apparatus according to claim 1, wherein the at least part of the procedure of performance testing comprises:
changing, by the apparatus, downlink transmission power level to values during predefined time intervals such that at least one of testing conditions is used for detecting whether the user equipment has performed measurements inside or outside correct measurement windows.

12. The apparatus according to claim 1, wherein there is a first measurement window in which a first transmission power is transmitted in the procedure of performance testing from the apparatus, and the conditions for the data transmission comprise at least one of:
a first condition comprises a validation condition for timing advance is satisfied, wherein a second transmit power in a second measurement window is such that |the second transmit power−the first transmit power| is not greater than a threshold and the data transmission is allowed;
a second condition comprises the validation condition for timing advance is not satisfied, wherein the second transmit power in the second measurement window is such that | the second transmit power−the first transmit power | is greater than the threshold and the data transmission is not allowed;
a third condition comprises the validation condition for timing advance is not satisfied, wherein the second transmit power in the second window is such that | the second transmit power−the first transmit power | is greater than the threshold, and the data transmission is not allowed, and a third transmit power outside the first measurement window is chosen such that |the second transmit power−third transmit power | is not greater than the threshold and when a reference signal is measured outside of the first measurement window the validation condition for the timing advance would be satisfied; or
a fourth condition, comprises the validation condition for timing advance is not satisfied, wherein a third transmit power transmitted from the apparatus before a start of the second measurement window, the second transmit power in the second measurement window is such that | the second transmit power−the first transmit power | is greater than the threshold, and the data transmission is not allowed and wherein a third transmit power before the start of the second measurement window is chosen such that |the second transmit power−the third transmit power | is not greater than the threshold.

13. The apparatus according to claim 2, wherein the data transmission comprises at least one of a small data transmission, a configured grant-small data transmission, a two-step random-access-small data transmission, or a four-step random-access-small data transmission.

14. The apparatus according to claim 2, wherein the one or more test data packages comprises one or more of the following:
time of a first data transmission to be performed at the apparatus;
a number of repetitions data transmissions to be performed at the apparatus; or
time between the repetitions.

15. The apparatus according to claim 2, wherein one or more triggers used to determine when to perform the data transmission comprise timing information for at least a first data transmission.

16. The apparatus according to claim 2, wherein the one or more test data packages comprises one or more of the following:
indication of a test mode to be used at the apparatus;
indication of timing of the data transmissions in relation to a command used to trigger the data transmission;
indication of how many data transmissions are to be performed;
indication of at least one of multiple data formats; or
indication of how many bytes are to be used for the data transmissions.

17. The apparatus according to claim 2, wherein the performance testing determines whether the apparatus obtains values of reference signal received power within specified measurement windows, wherein multiple power levels are used for different measurement windows.

18. The apparatus according to claim 2, wherein the at least part of the procedure of performance testing comprises:
downlink transmission power level is changed to values during predefined time intervals such that at least one of testing conditions is used for detecting whether the apparatus has performed measurements inside or outside correct measurement windows.

19. The apparatus according to claim 1, wherein the apparatus comprises a testing equipment.

20. The apparatus according to claim 2, wherein the apparatus comprises a user equipment.

\* \* \* \* \*